(12) United States Patent
Wormsbaecher

(10) Patent No.: US 7,419,434 B2
(45) Date of Patent: Sep. 2, 2008

(54) TORQUE TRANSFER DEVICE HAVING A CONSTANT VELOCITY JOINT OUTPUT

(75) Inventor: Hans Wormsbaecher, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 11/753,895

(22) Filed: May 25, 2007

(65) Prior Publication Data

US 2007/0238535 A1 Oct. 11, 2007

Related U.S. Application Data

(60) Division of application No. 11/431,312, filed on May 10, 2006, now Pat. No. 7,252,616, which is a continuation of application No. PCT/US2004/038742, filed on Nov. 18, 2004.

(60) Provisional application No. 60/555,202, filed on Mar. 22, 2004, provisional application No. 60/549,725, filed on Mar. 2, 2004, provisional application No. 60/544,090, filed on Feb. 11, 2004, provisional application No. 60/541,841, filed on Feb. 4, 2004, provisional application No. 60/520,879, filed on Nov. 18, 2003.

(51) Int. Cl.
*F16D 3/223* (2006.01)

(52) U.S. Cl. ..................... 464/178; 464/906

(58) Field of Classification Search ......... 464/140–146, 464/177, 178, 906; 475/202, 222; 74/606 R, 74/607

See application file for complete search history.

(56) References Cited

U.S. PATENT DOCUMENTS

| | | | | |
|---|---|---|---|---|
| 1,886,847 A | * | 11/1932 | Tenney et al. | ............... 464/140 |
| 2,822,880 A | * | 2/1958 | Gregory | ................. 464/145 X |
| 3,245,227 A | * | 4/1966 | Breuer | ....................... 464/140 |
| 3,362,192 A | * | 1/1968 | Orain | ......................... 464/146 |
| 4,138,906 A | | 2/1979 | Nakao et al. | |
| 4,371,049 A | | 2/1983 | Goeft et al. | |
| 4,723,464 A | | 2/1988 | Welschof et al. | |
| 4,793,212 A | | 12/1988 | Welschof et al. | |
| 5,116,293 A | | 5/1992 | Reuter | |
| 5,226,860 A | | 7/1993 | Baxter et al. | |
| 5,655,983 A | | 8/1997 | Dick | |
| 5,695,022 A | | 12/1997 | Zalewski et al. | |
| 5,916,055 A | | 6/1999 | Wormbaecher | |
| 6,319,132 B1 | | 11/2001 | Krisher | |
| 2002/0077186 A1 | * | 6/2002 | Hosoya et al. | ............. 464/145 |
| 2006/0258501 A1 | | 11/2006 | Wormsbaecher | |

* cited by examiner

*Primary Examiner*—Greg Binda
(74) *Attorney, Agent, or Firm*—Jennifer M. Brumbaugh; Mick A. Nylander

(57) ABSTRACT

A torque transfer device, such as a transfer case for a motor vehicle, having a constant velocity joint integrated therewith is disclosed. In one embodiment, the constant velocity joint includes an outer race rotatably mounted within the torque transfer device and an inner race positioned within the outer race and operatively connected to the outer race by one or more torque transmitting balls. The torque transfer device further includes a drive mechanism that is connected to the outer race of the constant velocity joint, wherein the drive mechanism transfers torque received from an input shaft to the outer race of the constant velocity joint such that the outer race drives the inner race. The torque transfer device further includes an output shaft that is rotatably connected to the inner race.

7 Claims, 27 Drawing Sheets

TORQUE TRANSFER DEVICE HAVING A CONSTANT VELOCITY JOINT OUTPUT

CROSS-REFERENCE TO RELATED APPLICATIONS

This application is a divisional of U.S. application Ser. No. 11/431,312, now U.S. Pat. No. 7,252,616, filed May 10, 2006 as a continuation of International Application PCT/US2004/038742, with an international filing date of Nov. 18, 2004. The International Application claims priority to U.S. Provisional Application No. 60/520,879 filed on Nov. 18, 2003; U.S. Provisional Application No. 60/541,841 filed on Feb. 4, 2004; U.S. Provisional Application No. 60/544,090 filed Feb. 11, 2004; U.S. Provisional Application No. 60/549,725 filed on Mar. 2, 2004; and U.S. Provisional Application No. 60/555,202 filed on Mar. 22, 2004, all of which are incorporated herein by reference in their entirety.

FIELD OF THE INVENTION

The present invention generally relates to a power transfer system. More particularly, the present invention relates to an improved torque transfer device having a constant velocity joint that is capable of angular drive connection between the torque transfer device output and a front or rear differential.

BACKGROUND

Four-wheel and all-wheel drive vehicles have increased in use and popularity within the past few years. There have been many types of power transfer systems that are utilized for distributing torque power within these all-wheel drive and four-wheel drive motor vehicles in a full-time or part-time mode. Generally, most known four-wheel drive power transfer systems include a torque transfer device, such as a transfer case having an input shaft driven by a transmission output shaft, a rear output shaft driven by the input shaft and which is interconnected via a rear propeller shaft to a rear axle assembly for driving the rear wheels. A front output shaft interconnected to a front propeller shaft or front differential generally drives the front wheels. A torque transfer arrangement for continuously or selectively transferring drive torque from the rear output shaft to the front output shaft or from the front output shaft to the rear output shaft generally also is integrated therein. This interaxle differentiation of torque enables the front wheels and rear wheels to rotate at different speeds, which occurs during normal turning of the motor vehicle or when the vehicle is off-road on mud, loose gravel, ice, snow, water and the like.

Generally, in part-time four-wheel drive systems the transfer case is equipped with a shift mechanism which permits a vehicle operator to selectively couple and decouple the front and rear output shafts for shifting the vehicle between a two-wheel drive mode and a four-wheel drive mode. Full-time four-wheel drive systems have a transfer case that is equipped with an interaxle differential for continuously dividing drive torque between the front and rear output shaft while permitting speed differentiation therebetween. To prevent traction loss due to excessive wheel slip, many of these full-time transfer cases are equipped with a slip limiting device for selectively or automatically locking the interaxle differential to limit or prevent speed differentiation in response to wheel slip.

Recently there has been an increase in on-demand power transfer systems that are used for automatically directing power to the non-driven wheels without any input or action on the part of the vehicle operator but, only if traction is lost at the driven wheels. Typically, these speed sensitive torque transfer devices are installed between the front and rear output shafts for progressively delivering torque to the front output shaft in response to increasing speed differentiation therebetween. These torque transfer devices may commonly include viscous couplings, gear couplings, power couplings, electric couplings and the like.

Generally, transfer cases are generally classified as either a single offset or double offset type. In single offset transfer cases, only one of the output shafts is offset from the rotational axis of the input shaft. In double offset transfer cases, the front and rear output shafts are commonly aligned and are both offset from the rotary axis of the input shaft. One known disadvantage of double offset transfer cases is an increased underbody space that often creates packaging issues, particularly with off-road vehicles.

Another known problem associated with prior art transfer cases is the departure angles at connections between the transfer case front and rear output shafts and their corresponding propeller shafts. The departure angles are defined as the included angle between the rotary axis of the propeller shaft and that of the transfer case output shaft. Generally, in the prior art, single Cardan joints were used at each end of the propeller shafts if the departure angle was approximately less than 5°. If the departure angle exceeded 5°, then double Cardan universal joints or other additional components were required by prior art, necessitating an increase in cost and causing additional packaging concerns.

To reduce costs and minimize packaging concerns, there exists a need for a torque transfer device, such as a transfer case, that is capable of operating at the high departure angles found at the output shafts of the transfer case of modern-day four-wheel drive vehicles. These high output angles are anywhere from 10 to 20° in modern-day off-road or four-wheel drive vehicles. There also is a need in the art to produce more efficient packaging and reduction of extraneous noise in the transfer case caused by the use of constant velocity ball joints. Further, there is a need in the art for a more efficient way to transfer torque within the transfer case from the input shaft to both the rear output shaft and the front output shaft of the transfer cases.

SUMMARY OF THE INVENTION

In accordance with the present invention, an improved torque transfer device that cooperates with a constant velocity joint is disclosed. The torque transfer device includes an input shaft and at least one output shaft. The constant velocity joint includes an outer race that is rotatably supported within the torque transfer device. An inner race is positioned within a cavity of the outer race. An output shaft is rotatably fixed to the input shaft. At least one rolling element is arranged between the outer race and the inner race, and may also include a cage for positioning and retaining the rolling element therein. A drive mechanism is operatively connected to the outer race and the input shaft. As the input shaft rotates, the drive mechanism transfers the torque generated to the outer race such that the outer race drives the inner race, thereby driving the output shaft. The drive mechanism may incorporate a chain and sprocket drive system, a bevel gear torque transfer system or a conventional in-line gear torque transfer system.

In one embodiment, the outer race is a solid piece thus allowing for grease or other suitable lubricant to be sealed within the constant velocity joint while keeping lubricating oil from the torque transfer device from entering the constant velocity joint. A boot may be arranged between the output shaft and either a surface of the transfer case or the outer race of the constant velocity joint to protect and seal the constant velocity joint from external contaminates. The boot may be a fixed or rotating boot. The constant velocity joint may be either a plunging type joint or be fixed at predetermined high angle departures.

DETAILED DESCRIPTION

Referring to the figures generally, a constant velocity joint for use with a transfer case in accordance with to the present invention is shown. While the invention will be described for use with a transfer case of a motor vehicle, it is understood that other applications, such a gear box or for marine applications, are also considered to be within the scope of the invention. The transfer case is preferably for use in an all-wheel drive or four-wheel drive system, however it is understood that the transfer case may be used in any known vehicle system. Indeed, it should also be noted that the transfer case may be adapted to perform in a front-wheel drive only or rear-wheel drive only vehicle system.

The transfer case generally receives power from a vehicle engine via a transmission at an input shaft. As the input shaft rotates, both a rear output shaft and a front output shaft also rotate, as each are operatively connected to a rear differential and front differential on each end thereof, respectively. Because of the problems associated with prior art transfer cases operating at high departure angles between the output shafts of the transfer case and the propeller shafts between the front and rear differentials, the present invention, which utilizes a constant velocity joint, either a plunging or fixed type, allows the transfer case to operate at higher departure angles, and also permits appropriate compensation of changing departure angles caused by vehicle off-road conditions.

Figure 1:
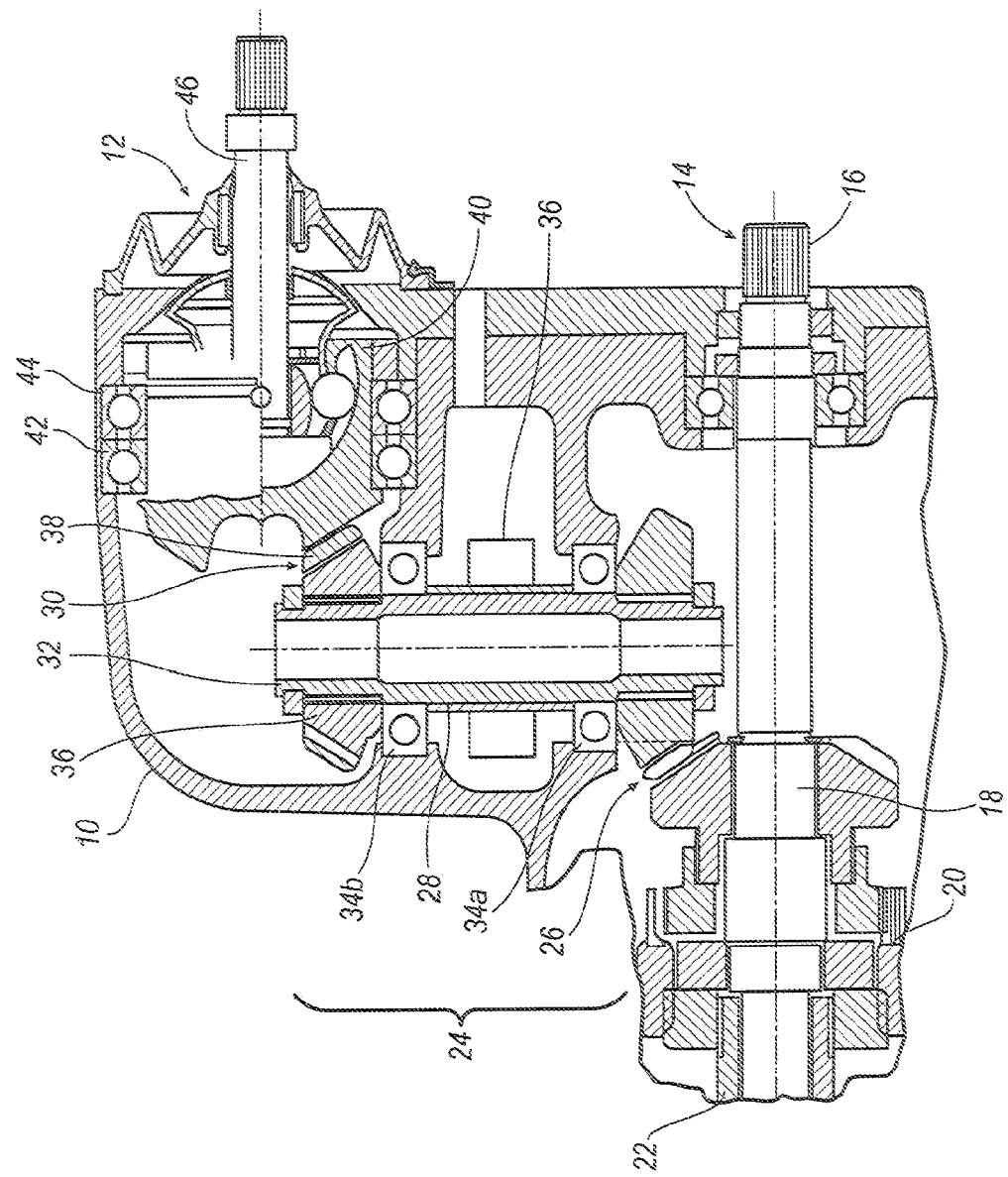
FIG. 1 illustrates a cross section of a transfer case that incorporates a constant velocity joint and utilizes a bevel gear drive mechanism according to the present invention.

Turning now to FIG. 1, the components of a transfer case 10 having a constant velocity joint 12 in accordance with the present invention will be discussed. Transfer case 10 includes an input shaft 14 that connects to a vehicle transmission on a first end 16 thereof. An opposite end 18 of input shaft 14 engages with a differential 20 that has a gearing system that transmits the input torque generated by input shaft 14 to both a rear output shaft 22 of transfer case 10 and to a torque transfer system positioned on an opposite side of differential 20 from rear output shaft 22. In one embodiment, torque transfer system is a bevel gear torque transfer system 24. Bevel gear torque transfer system 24 includes a first set of bevel gears 26, wherein first set of bevel gears 26 takes the torque from input shaft 14 via differential 20, and transfers the torque through a stub shaft 28 to a second set of bevel gears 30 located on an opposite end 32 of the stub shaft 28. Stub shaft 28 is rotatably supported by at least one set of bearings. In one embodiment bearings 34a and 34b are located adjacent first and second set of bevel gears 26, 30 within transfer case 10. An optional torsional damper 36 may also be arranged around stub shaft 28 to reduce vibration and noise.

Second bevel gear set 30 includes a bevel gear 36 attached to one end 32 of stub shaft 28 while another bevel gear 38 is operatively connected to an outer race 40 of constant velocity joint 12 in accordance with the present invention. In one embodiment, bevel gear 38 is integrally formed with outer race 40. A front output shaft 46 is operatively connected to constant velocity joint 12.

In one embodiment, outer race 40 is supported via at least one set of bearings 42, 44 within transfer case 10. Therefore, the input torque generated by the vehicle transmission is transferred via a differential 20 to both rear output shaft 22 and front output shaft 46. While the torque transmitted by front output shaft 46 is delivered via a bevel gear torque transfer system 24 in the embodiment, as discussed below, other torque transfer systems are also contemplated within transfer case 10. Further, while FIG. 1 utilizes a fixed constant velocity joint 12, it is understood that plunging or multi-ball joints may also be used as constant velocity joint 12 without departing from the invention.

Figure 2:
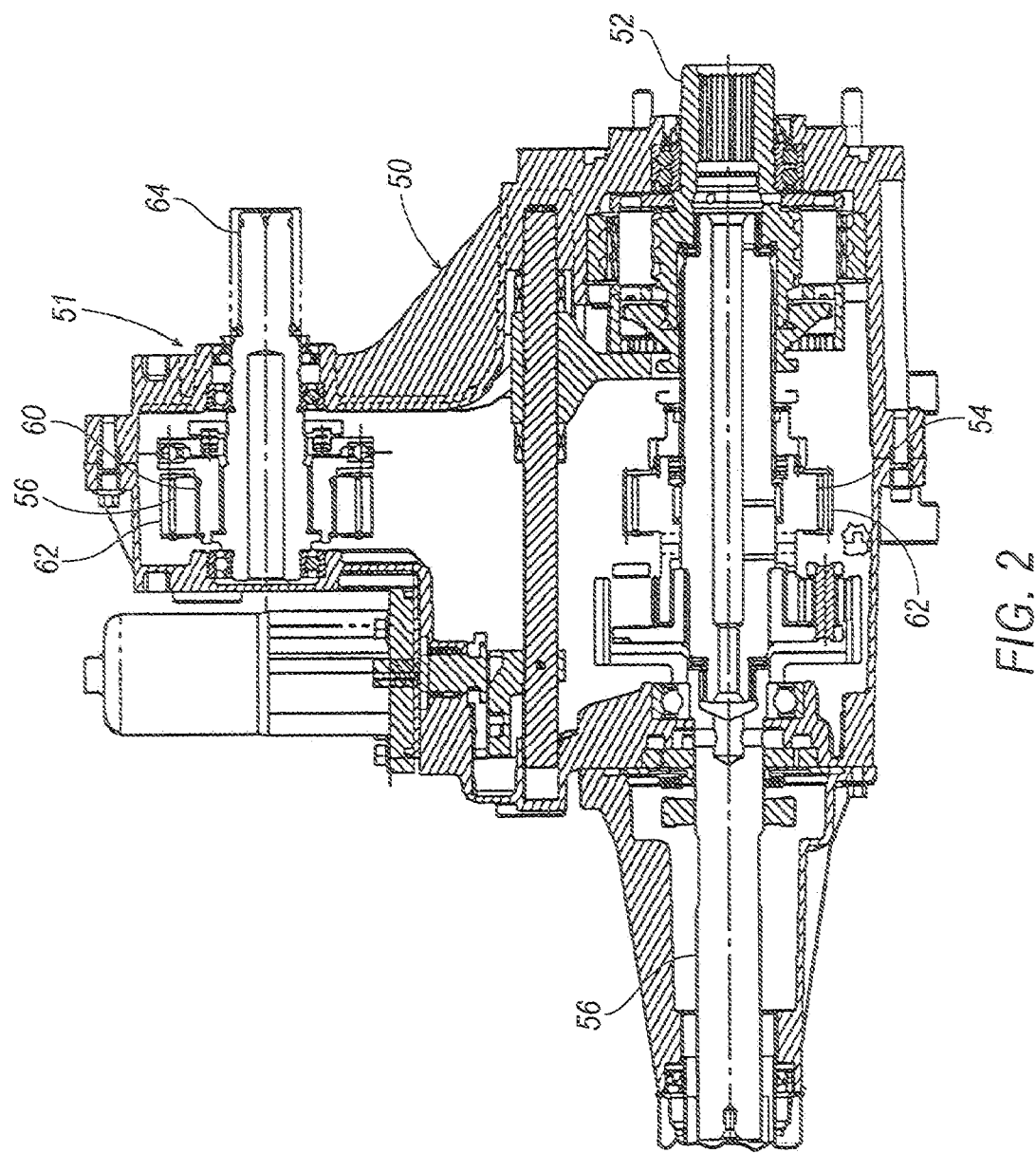
FIG. 2 illustrates a cross section of an alternative embodiment of a transfer case according to the present invention that utilizes a sprocket and chain drive mechanism.

FIG. 2 illustrates an alternative embodiment of a transfer case 50 that incorporates a constant velocity joint 51 in accordance with the present invention. Transfer case 50 includes an input shaft 52 that is operatively connected to both a first sprocket 54 and to a rear output shaft 56 on an end thereof. First sprocket 54 is aligned with a second sprocket 56. First sprocket 54 is rotatably fixed with respect to input shaft 52 of the transfer case 50. Second sprocket 56 on the opposite side of transfer case 50 is rotatably fixed with respect to an outer race 60 of constant velocity joint 51. Second sprocket 56 is operatively connected to constant velocity joint 51 according to the present invention by chain 62 that extends around and engages the outer periphery of both sprockets 54, 56. Chain 62 operates to transfer the torque generated from input shaft 52 to a front output shaft 64 that extends from transfer case 50. Any of the constant velocity joints discussed herein may be capable of being used in transfer case 50 that uses a chain and sprocket method depicted in FIG. 2 to transfer torque from input shaft 52 to front output shaft 64.

Figure 3:
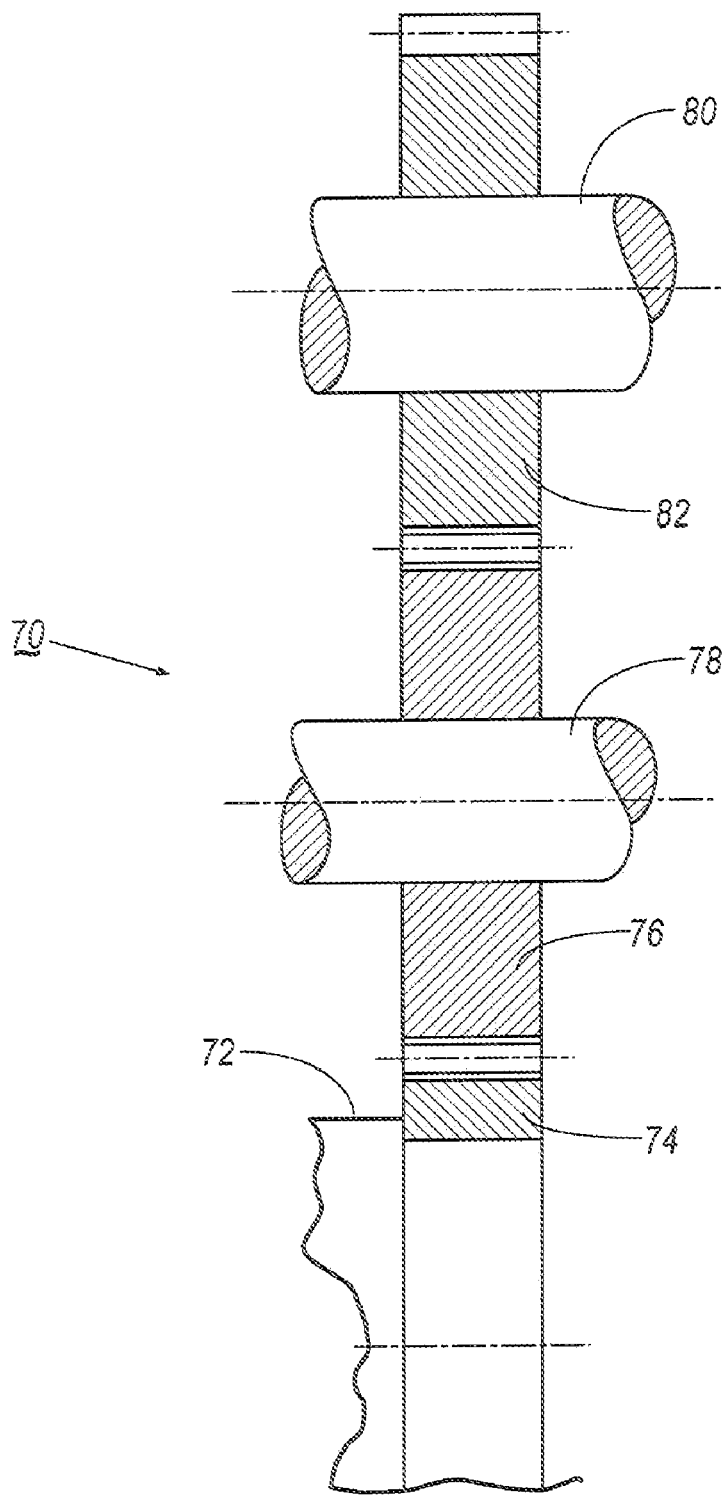
FIG. 3 illustrates a partial cross section of an alternative embodiment of an inline gear torque transfer system for use in a transfer case.

FIG. 3 depicts a cross section of a torque transfer system 70 that uses a conventional inline gear transfer system. More specifically, in torque transfer system 70, an input shaft 72 generates torque in a transfer case. An input shaft drive gear 74 is connected to input shaft 72. Drive gear 74 includes a plurality of teeth thereon that are in engagement with a high speed gear 76 that is operatively connected to an idler shaft 78. An output shaft 80 is provided with an output shaft drive gear 82. Like input shaft drive gear 74, output shaft drive gear 82 also includes a plurality of teeth that are in engagement with corresponding teeth formed on high speed gear 76. Thus, torque from input shaft 72 in the transfer case will rotate input shaft drive gear 74 at a predetermined speed. This speed will be transferred by the input shaft drive gear 74 to high speed gear 76 wherein the high speed gear 76 will be in contact with the output shaft drive gear 74 on the opposite side thereof. Therefore, the torque of input shaft 72 will be passed via the high speed gear 76 to the opposite end of torque transfer system 70 to output shaft 80 for the front differential. It should also be noted that these transfer cases may also have the front output shaft and the rear output shafts aligned with one another. However, in the embodiment shown in FIG. 3, the front output shaft and the rear output shaft are separated by a predetermined distance. This set up decreases packaging space in the all-wheel drive and four-wheel vehicles. Therefore, any type of constant velocity joint discussed herein may also be used with the conventional drive type gear torque transfer system 70 as shown in FIG. 3 for a transfer case.

Generally, the transfer cases of FIGS. 1-3 are all operated in an oil to provide appropriate lubrication and cooling of the transfer case system. However, it should be noted that it is also contemplated within the scope of the invention to use grease as the transfer case lubricant and coolant.

Figure 4:
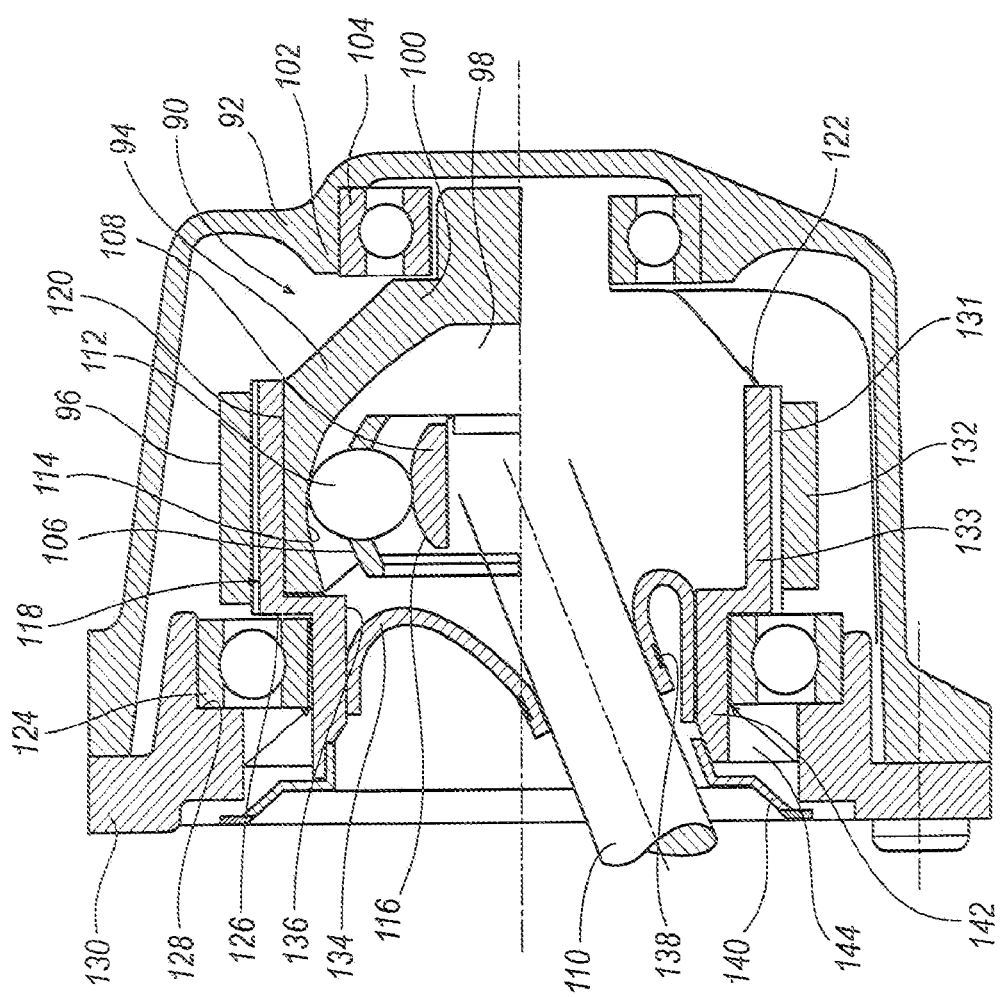
FIG. 4 illustrates a cross section of a constant velocity joint integrated into a transfer case according to the present invention.

FIG. 4 illustrates a constant velocity joint 90 for use with a torque transfer device such as a transfer case 92 in accordance with the present invention. Constant velocity joint 90 includes an outer race 94, which is preferably a solid member such that there are no hollow shafts or hollow parts, which interconnect or communicate in any way with an interior chamber 96 of transfer case 92. This will ensure that transfer case oil, which is used to lubricate transfer case 92, does not seep into or contaminate an inner chamber 98 of constant velocity joint 90.

Outer race 94 of constant velocity joint 90 includes a shoulder portion 100. Shoulder portion 100 cooperates with a mounting portion 102 formed on an interior wall of transfer case 92 to position and support a bearing 104. Bearing 104 operates to rotatably support outer race 94. Constant velocity joint outer race 94 it preferably constructed of a steel material for durability and strength, however it should be noted that any other metal material, hard plastic, composite or ceramic may also be used depending on the design requirements of the constant velocity joint 90 in the vehicle.

Constant velocity joint 90 further includes a roller cage 106 positioned within a bore of outer race 94. Roller cage 106 includes a plurality of orifices through a surface thereof. An inner race 108 is arranged within roller cage 106 and also includes a bore there through. The bore includes a plurality of splines or teeth on an inner surface thereof for connecting with an output shaft 110 for transfer case 92. In accordance with one aspect of the present invention, output shaft 110 and inner race 108 are rotatably fixed with respect to one another. A plurality of torque transmitting balls 112 are arranged between an inside surface 114 of outer race 94 and an outer surface 116 of inner race 108. Balls 112 are arranged within the orifices of roller cage 106 to ensure that balls 112 remain positioned within the designated ball track on outer race 94 and inner race 108, respectively. It should be noted that roller cage 106, balls 112 and inner race 108 are preferably constructed of a steel material, but it has been contemplated to use any other metal materials, ceramic, hard plastic or composite material.

As also shown in FIG. 4, a sprocket 118 is connected to an outer surface 120 of outer race 94. Any suitable type of mechanical or chemical connection may be used to connect sprocket 118 to outer race 94. In one embodiment, sprocket 118 is fixedly connected to outer surface 120 via a weld 122. Sprocket 118 is rotatably supported within transfer case 92 via a bearing 124 that is positioned between a mounting surface 126 of sprocket 118 and a corresponding mounting surface 128 formed on a mounting bracket 130 that connects to transfer case 92. Sprocket 118 includes a plurality of teeth 131 on an outside surface of a section 133 of sprocket 118. A chain 132 is looped around the outside surface of sprocket 118 such that one end of the loop engages teeth 130. An opposite end of the loop of chain 132 connects to the input shaft (see, e.g., input shaft 50 in FIG. 2) of transfer case 92 via a corresponding sprocket (see, e.g., sprocket 52, FIG. 2) connected thereto.

Constant velocity joint 90 further includes a boot 134 that is positioned between an interior surface 136 of sprocket 118 and output shaft 110. In an alternative embodiment, boot 134 may be connected to outer race 94. Boot 134 is fixed via any known fastener to sprocket 118 and to output shaft 110. For example, in one embodiment, a clamp 138 is used to secure boot 134 to output shaft 110. During operation, boot 134 rotates with output shaft 110 and constant velocity joint 90. Boot 134 allows for constant velocity joint 90 to be lubricated with the grease, while serving to keep the grease within constant velocity joint 90 and protecting constant velocity joint 90 from outside contaminates.

In one embodiment, constant velocity joint 90 may also include a ring cover 140 that is arranged between an end portion 142 of the sprocket 118 and mounting bracket 130. It may also be desirable to incorporate a seal 144 into the present invention. Seal 144 is positioned between mounting bracket 130 and end portion 142 of sprocket 118. Ring cover 140 and seal 144 both serve to ensure that oil from transfer case 92 does not leak therefrom or penetrate into inner chamber 98 of constant velocity joint 90. Therefore, constant velocity joint 90 will have its own lubrication system (for example, grease) while transfer case 92 will have an oil lubricant to lubricate and cool the transfer case components.

In accordance with one aspect of the invention, constant velocity joint 90 is capable of operating at very high departure angles with respect to the propeller shafts connected between a rear and/or front differential. This new version of a constant velocity joint, which is integrated within transfer case 92 will reduce the width necessary for the transfer case thus increasing packaging space for other components of the all-wheel drive vehicles.

Constant velocity joint 90 as described herein is capable of being any of the types of fixed or plunging joints known in the art. These joints may be any type of number of ball joints, such as a six ball joint, an eight ball joint or a ten ball joint, and may be cross groove, fixed, fixed tripod, double offset type joints, etc. In accordance with one aspect of the invention, the use of constant velocity joint 90 will allow for greater departure angles between output shaft 110 of transfer case 92 and the shaft connecting to the front differential or rear differential.

Figure 5:
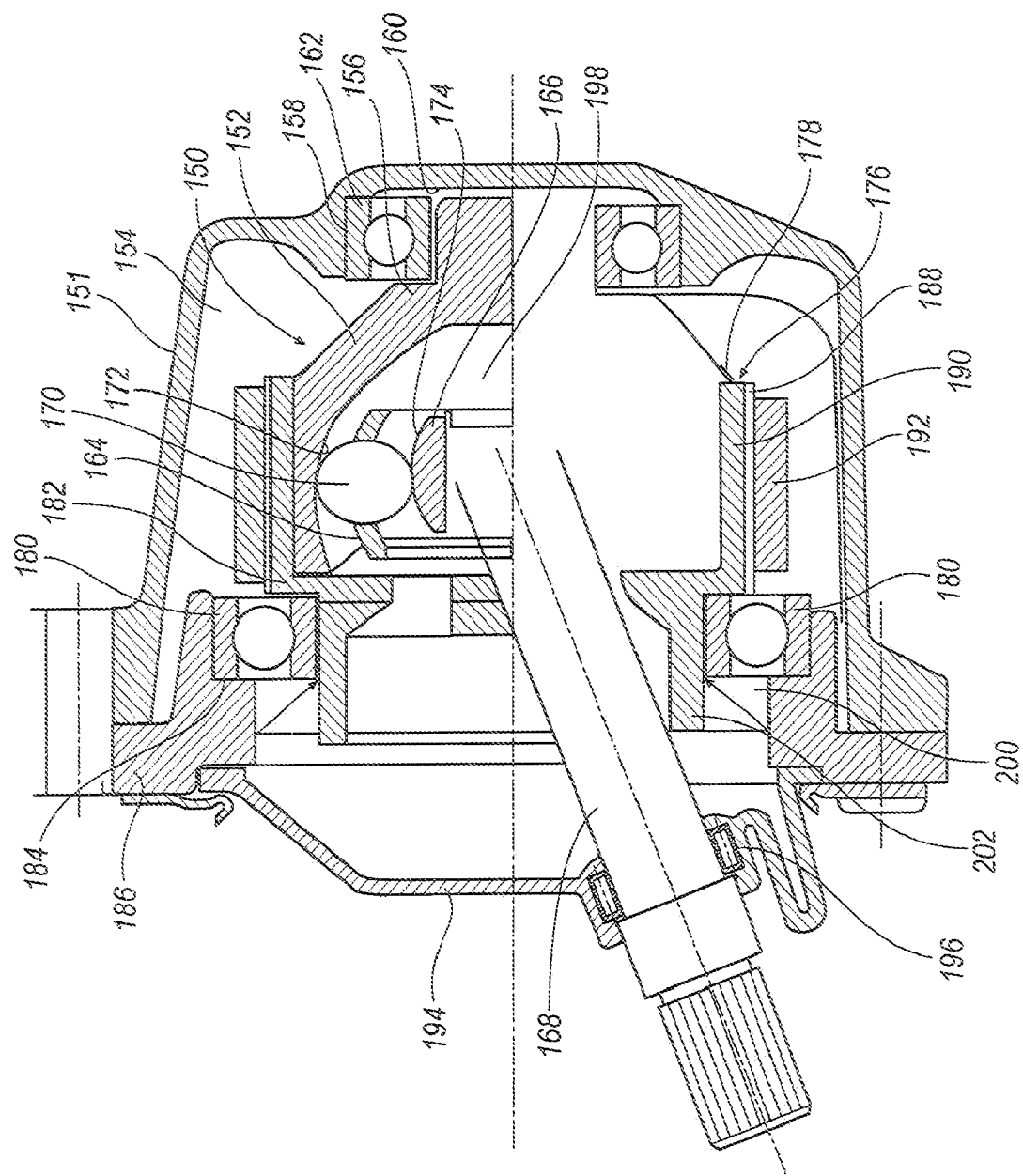
FIG. 5 illustrates the constant velocity joint of FIG. 4, with an alternative sealing device in accordance with the present invention.

FIG. 5 illustrates an alternative embodiment of a fixed constant velocity joint 150 that is positioned within a transfer case 151 in accordance with the present invention. Constant velocity joint 150 includes an outer race 152, which is preferably a solid piece with no openings or hollow portions that are connected with an interior chamber 154 of transfer case 151. Outer race 152 includes a shoulder portion 156 that cooperates with a corresponding mounting portion 158 formed on an interior wall 160 of transfer case 151 to retain a bearing 162. Bearing 162 rotatably supports outer race 152 within transfer case 151.

Constant velocity joint 150 also includes a roller cage 164 arranged within a bore of outer race 152 of the constant velocity joint 150. Roller cage 164 includes a plurality of orifices through a surface thereof. Inner race 166 is arranged within roller cage 164 and includes a bore there through. The inner race 166 bore includes a plurality of splines or teeth on an inner surface thereof for connecting with an output shaft 168. Output shaft 168 and inner race 166 are rotatably fixed with respect to one another. In accordance with one aspect of the invention, output shaft 168 is capable of operating at high departure angles with respect to transfer case 151.

A plurality of torque transmitting balls 170 are arranged between an inside surface 172 of outer race 152 and an outer surface 174 of inner race 166. Balls 170 are arranged within the orifices of roller cage 164 to ensure that balls 170 remain within the designated ball track on outer race 152 and inner race 166 during operation. It is preferred that roller cage 164, balls 170, outer race 152, and inner race 166 are all made of a steel material for durability and strength. However, it is also contemplated that any other suitable metal, ceramic, hard plastic or composite material may be employed for these parts within constant velocity joint 150 without departing from the invention.

Constant velocity joint 150 may also include a sprocket 176 that is connected and secured to an outside surface of outer race 152. Any suitable type of mechanical or chemical connection may be employed to connect sprocket 176 to outer race 152. In one embodiment, a weld 178 fixedly secures sprocket 176 to outer race 152.

Sprocket 176 is rotatably supported within transfer case 151 via a bearing 180. Bearing 180 is positioned between a mounting surface 182 of sprocket 118 and a corresponding mounting surface 184 formed on a mounting bracket portion 186 of transfer case 150. Bearing 180 serves to permit sprocket 176 and constant velocity joint 150 to rotate with respect to transfer case 151. Sprocket 176 further includes a plurality of teeth 188 formed on an outside surface of a section 190 of sprocket 176. A chain 192 is looped around the outside surface of sprocket 176 such that one end of the loop engages teeth 188. An opposite end of the loop of chain 192 connects to the input shaft (see, e.g., input shaft 50 in FIG. 2) of the transfer case 151 via a second sprocket (see, e.g., sprocket 52, FIG. 2) connected thereto. Due to the chain/sprocket arrangement, constant velocity joint 150 will rotate at the input shaft speed.

Constant velocity joint 150 may further include a boot 194 that is secured to mounting bracket 186 of transfer case 151, around output shaft 168. In an alternative embodiment, boot 194 may be connected to a mounting bracket 186 or to outer race 152. Boot 194 may be fixed via any known fastener to mounting bracket 186. In accordance with one aspect of the invention, boot 194 is secured to output shaft 168 by a roller bearing 196 such that output shaft 168 may rotate with respect to boot 194. In this embodiment, boot 194 is a non-rotating boot that serves to seal grease or other suitable lubricant within constant velocity joint 150. Boot 194 also serves to keep contaminates from the outside environment from penetrating an inner chamber 198 of constant velocity joint 150.

Boot 194 is preferably constructed of urethane. However, it is understood that other suitable pliable materials, such as rubber, plastic, composites or fabric, may be employed for constructing boot 194. Indeed, any material may be used so long as the material for boot 194 is capable of withstanding high temperatures and high speed rotation of constant velocity joint 150 while staying pliable to accommodate any changes in angles of constant velocity joint 150 due to driving conditions.

In one embodiment, constant velocity joint 150 is lubricated with grease. The grease is capable of penetrating out to boot 194, thereby lubricating generally the entire output shaft 168 along with all of the inner workings of constant velocity joint 150. The outer surface of constant velocity joint 150 is preferably coated in lubricating oil of transfer case 151. As mentioned above, lubricating oil is unable to penetrate into inner chamber 198 of constant velocity joint 150 such that the lubricating grease of constant velocity joint 150 remains uncontaminated.

It is also desirable that transfer case 151 further includes a seal 200 that is arranged between an end portion 202 of sprocket 176 and mounting bracket 186 of transfer case 151.

Figure 6:
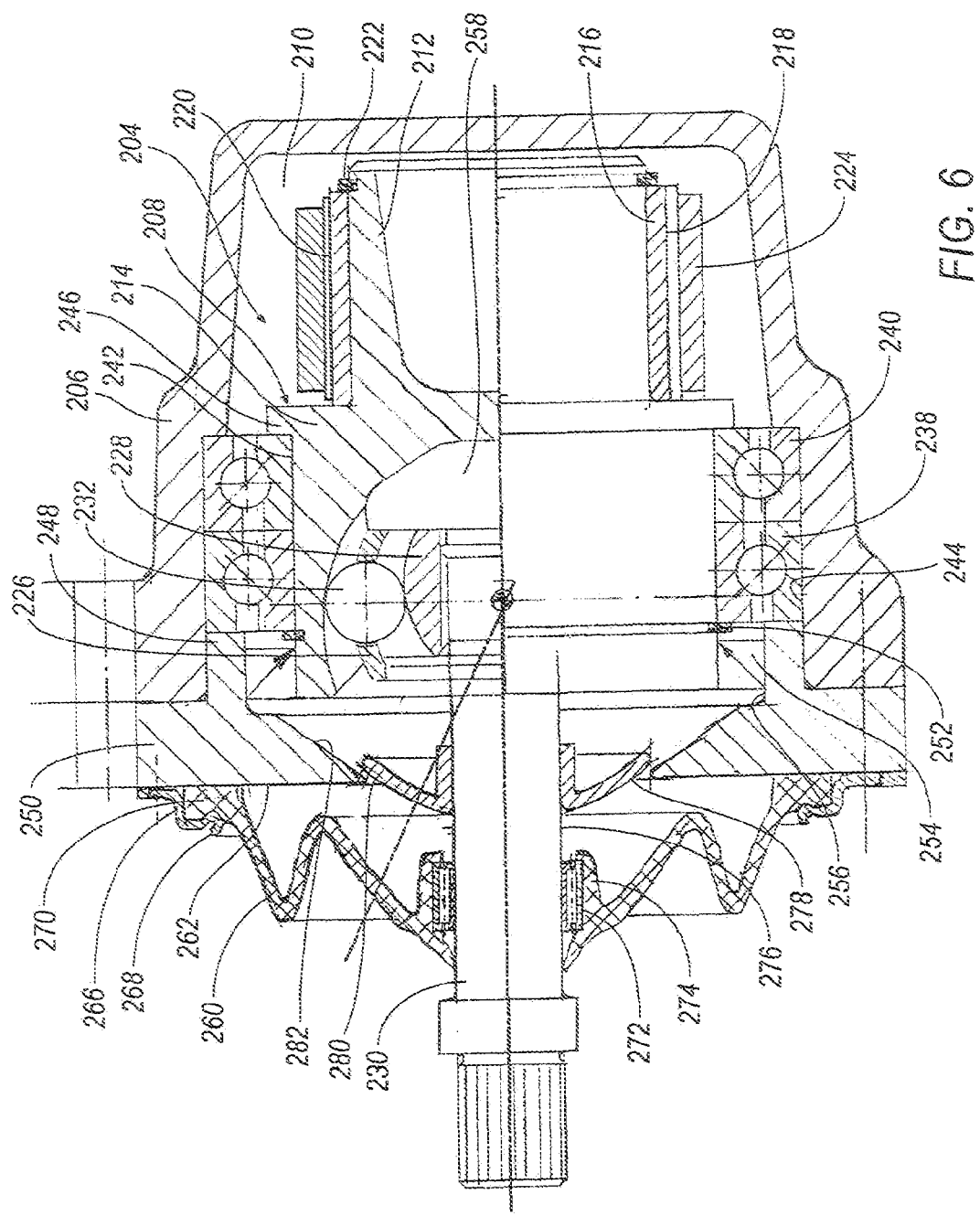
FIG. 6 shows an alternative embodiment of a constant velocity joint positioned within a transfer case according to the present invention.

FIG. 6 illustrates yet another alternative embodiment of a constant velocity joint 204 positioned within a transfer case 206 according to the present invention. Constant velocity joint 204 includes an outer race 208 that preferably is formed as a solid body with no openings or hollow portion that are connected to or in communication with an interior chamber 210 of transfer case 206. Outer race 208 is generally made of a steel material, however it should be noted that any other metal material, hard plastic, composite or ceramic may also be used depending on the design and operational requirements of constant velocity joint 204 and the vehicle.

Outer race 208 further includes an extension portion 212 that extends laterally from a main body portion 214 of outer race 208. While extension portion 212 is shown in FIG. 6 to be hollow, it is understood that extension portion 212 may be hollow or a solid body depending on the design requirements of the automotive vehicle.

Extension portion 212 may further include a sprocket 216 mounted on an outside surface thereof. Sprocket 216 includes a plurality of teeth 218 positioned on an outside surface 220 thereof. Sprocket 216 is connected to extension portion 212 of outer race 208 by any known fastening techniques, chemical or mechanical in nature. In one preferred embodiment a snap ring 222 is used to connect sprocket 216 to extension portion 212 extending from outer race 208.

A chain 224 is looped around the outside surface of sprocket 216 such that one end of the chain loop engages teeth 218. An opposite end of the chain loop connects to the input shaft (see, e.g., input shaft 50 in FIG. 2) of transfer case 206 via a second sprocket (see, e.g., sprocket 52, FIG. 2) connected thereto. Due to the chain/sprocket arrangement, constant velocity joint 204 will rotate at the input shaft speed.

It should be noted that other suitable drive mechanisms may be used in connection with the constant velocity joints shown in the various embodiments of FIGS. 4-28. In other words, the invention is not limited to the use of a chain and sprocket drive mechanism. Inline conventional type gear mechanisms, as shown in FIG. 3 or a bevel gear mechanism, as shown in FIG. 1 may also be employed.

A roller cage 226 is arranged within a bore of outer race 208 of constant velocity joint 204. Roller cage 226 includes a plurality of orifices through a surface thereof. An inner race 228 is arranged within roller cage 226 and includes a bore there through. In accordance with one aspect of the invention, the bore includes a plurality of splines or teeth on an inner surface thereof for connecting with an output shaft 230. Output shaft 230 and in inner race 228 are rotatably fixed with respect to one another. A plurality of torque transmitting balls 232 are arranged between an inside surface 234 of outer race 208 and an outer surface 236 of inner race 228. Balls 232 are arranged within the orifices of roller cage 226 to ensure that balls 232 stay within the designated ball track on outer race 208 and inner race 228. It should be noted that roller cage 226, balls 232 and inner race 228 are all preferably made of a steel material for strength and durability. However, it is also contemplated that any other suitable metal material, ceramic, hard plastic or composite material may be employed for these parts within constant velocity joint 204.

Constant velocity joint 204 also includes at least one set of bearings such as a first and second set of bearings 238, 240. First and second set of bearings 238 and 240 are arranged between an outer surface 242 of outer race 208 and an interior wall portion 244 of transfer case 206. A retaining lip 246 formed on outer race 208 cooperates with a positioning projection 248 formed on a mounting bracket 250 of transfer case 206 to properly position first and second set of bearings 238, 240. It is also preferred that a snap ring 252 is employed to secure first and second set of bearings 238, 240. First and second set of bearings 238 and 240 permit constant velocity joint 204 to rotate with respect to transfer case 206.

In accordance with another aspect of the invention, it is also preferred that a sealing device 254 is provided. Sealing device 254 is positioned adjacent first set of bearings 238 and along an inside surface 256 of mounting bracket 250 of transfer case 206. Sealing device 254 is employed to ensure that lubricating oil does not leak from interior chamber 210 of transfer case 206 into an inner chamber 258 of constant velocity joint 204.

In accordance with another aspect of the invention, constant velocity joint 204 may also be provided with a boot 260. Boot 260 is positioned on an outer surface 262 of mounting bracket 250 of transfer case 206, and includes an opening that surrounds output shaft 230. Boot 260 may be secured to outside surface 262 of mounting bracket 250 via any known fastening mechanism. In one preferred embodiment, a securing member 266 is provided that includes an end portion 268 that crimps on top of an annular member 270 of boot 260.

Boot 260 may be secured around output shaft 230 by any suitable fastening mechanism. In the embodiment shown in FIG. 6, boot 260 is a non-rotating boot 260 with respect to constant velocity joint 204. A needle bearing 272 is positioned between a mounting lip 274 of boot 260 and an outside surface 276 of output shaft 230. Needle bearing 272 permits output shaft 230 to rotate with respect to boot 260, while keeping boot 260 fixed with respect to transfer case 206.

Constant velocity joint 204 may also include an umbrella cap 278. Umbrella cap 278 is positioned around output shaft 230 and has an end portion 280 that abuts an interior wall 282 of mounting bracket 250 of transfer case 206. Umbrella cap 278 allows the lubricating grease that is used to lubricate inner chamber 258 of constant velocity joint 204 to remain within constant velocity joint 204 such that the lubricating grease does contaminate and/or degrade boot 260. Umbrella cap 278 rotates with respect to output shaft 230. However, it should be noted that umbrella cap 278 may be designed such that it is non-rotating with respect to the output shaft 230.

Figure 7:
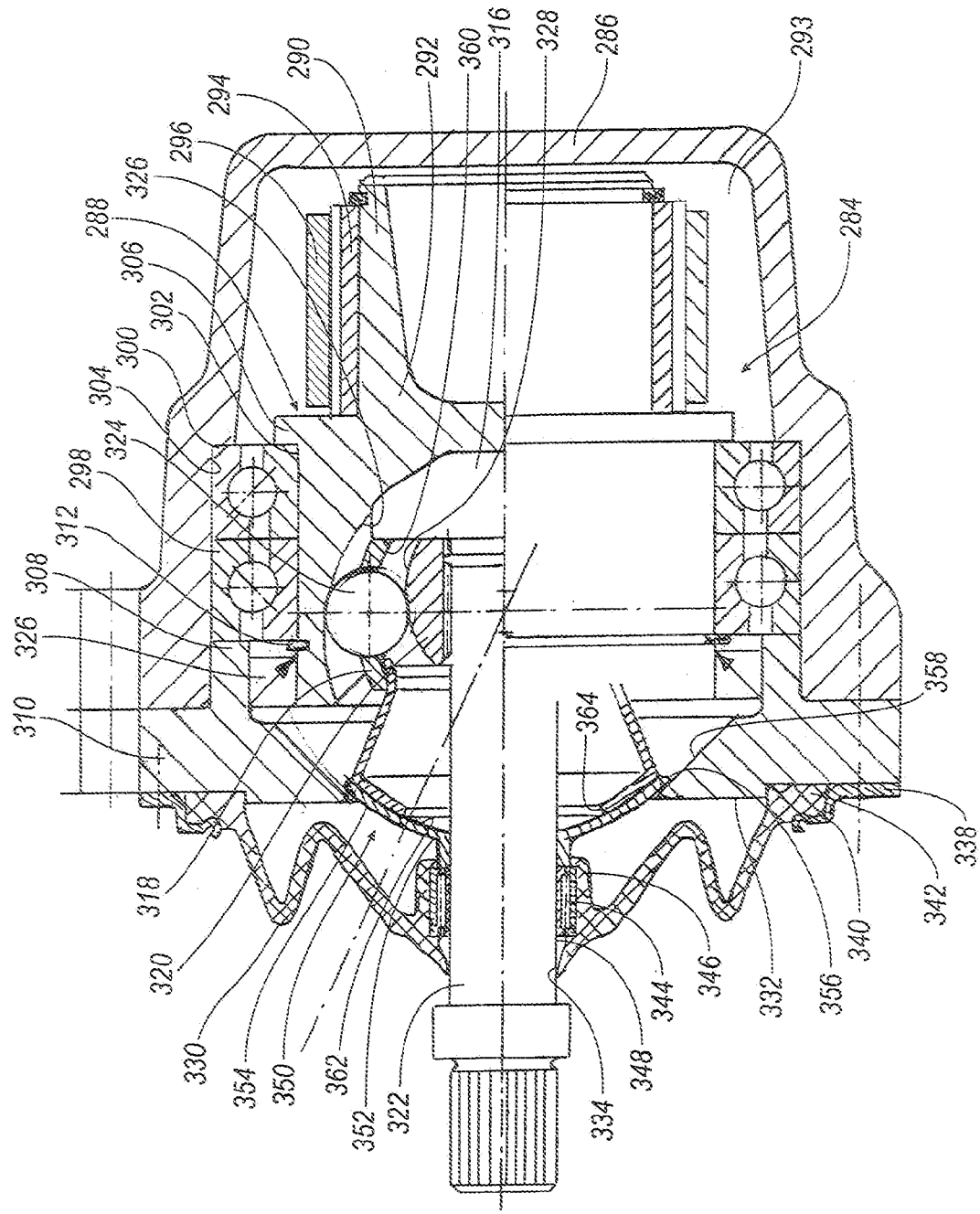
FIG. 7 illustrates the constant velocity joint in FIG. 6, with an alternative sealing device in accordance with the present invention.

FIG. 7 illustrates yet another alternative embodiment of a fixed constant velocity joint 284 positioned within a transfer case 286 in accordance with present invention. Constant velocity joint 284 includes an outer race 288 that includes an extension portion 290 that extends laterally from a main body portion 292 of outer race 288. Outer race 288 is preferably formed as a solid body with no openings or hollow portions that are connected to or in communication with an interior chamber 293 of transfer case 286. Outer race 288 is generally made of a steel material, however it should be noted that any other metal material, hard plastic, composite or ceramic may also be used depending on the design and operational requirements of constant velocity joint 284 and the vehicle. It is also preferred that extension portion 290 includes the same sprocket 294 and chain 296 drive system as that described above in connection with FIG. 6, although other drive mechanisms are also contemplated.

Constant velocity joint 284 is rotatably supported with respect to transfer case 286 via a first and second set of bearings 298 and 300. First and second bearings 298 and 300 are positioned between an outer surface 302 of outer race 288 and an interior wall portion 304 of transfer case 286. A retaining lip 306 formed on outer race 288 cooperates with a positioning projection 308 formed on a mounting bracket 310 of transfer case 286 to properly position first and second set of bearings 298 and 300. It is also preferred that a snap ring 312 is employed to secure first and second set of bearings 298 and 300. First and second set of bearings 298 and 300 permit constant velocity joint 284 to rotate with respect to transfer case 286.

In accordance with one aspect of the invention, a seal 326 is positioned between outer race 288 and transfer case 286 to ensure that lubricating oil does not leak from transfer case 286 into an inner chamber 316 of constant velocity joint 284.

Constant velocity joint 284 further includes a roller cage 318 that is positioned within a bore of an inner race 320 of constant velocity joint 284. Roller cage 318 includes a plurality of orifices through a surface thereof. Inner race 320 is positioned within roller cage 318 and includes a bore therethrough. The bore includes a plurality of splines or teeth on an inner surface thereof for connecting with an output shaft 322. Output shaft 322 and inner race 320 are rotatably fixed with respect to one another. A plurality of torque transmitting balls 324 are arranged between an inside surface 326 of outer race 288 and an outer surface 328 of inner race 320. Balls 324 are arranged within the orifices of roller cage 318 to ensure that balls 324 stay within the designated ball track on outer race 288 and inner race 320. It should be noted that roller cage 318, balls 324, outer race 288 and inner race 320 are all preferably made of a steel material in one embodiment, but it has been contemplated to use any other suitable metal material, ceramic, hard plastic or composite material for these parts within constant velocity joint 284.

In accordance with another aspect of the invention, constant velocity joint 284 also includes a boot 330. Boot 330 is positioned on an outer surface 332 of mounting bracket 310 of transfer case 286, and includes an opening 334 that surrounds output shaft 322. Boot 330 may be secured to outside surface 332 of mounting bracket 310 via any known fastening mechanism. In one preferred embodiment, a securing member 338 is provided that includes an end portion 340 that crimps on top of an annular member 342 of boot 330.

Boot 330 may be secured around output shaft 322 by any suitable fastening mechanism. In the embodiment shown in FIG. 6, boot 330 is a non-rotating boot 330 with respect to constant velocity joint 284. A needle bearing 344 is positioned between a mounting lip 346 of boot 330 and an outside surface 348 of output shaft 322. Needle bearing 344 permits output shaft 322 to rotate with respect to boot 330, while keeping boot 330 fixed with respect to transfer case 286.

Constant velocity joint 284 also includes a two-piece shield 350. Two-piece shield 350 includes a first portion 352 and a second portion 354. First portion 352 has a generally umbrella shape with an orifice through a center thereof through which output shaft 322 extends. First portion 352 has an end member 356 that abuts an inside surface 358 of mounting bracket 310. First portion 352 allows the lubricating grease that is used to lubricate inner chamber 316 of constant velocity joint 284 to remain within constant velocity joint 284 such that the lubricating grease does not contaminate and/or degrade boot 330. First portion 352 rotates with respect to output shaft 322. However, it should be noted that first portion 352 may be designed such that it is non-rotating with respect to the output shaft 322.

Second portion 354 is positioned between an inside surface 360 of roller cage 318 and an inside surface 362 of first portion 352. Second portion 354 also includes an orifice 364 that aligns with the orifice of first portion 352 and receives output shaft 322. Two-piece shield 350 operates to ensure that no grease exits inner chamber 316 of the constant velocity joint 284 and contaminates boot 330. Further, use of two shield system 350 will ensure that even at the highest operating angles no grease is capable of leaving inner chamber 316 of constant velocity joint 284. Both first and second portions 352 and 354 of two-piece sealing shield 350 are mounted to transfer case 286 such that first and second portions 352 and 354 move relative to one another so that at the highest angles of operation of output shaft 322 there will still be a defined sealing chamber for inner chamber 316 of constant velocity joint 284.

Figure 8:
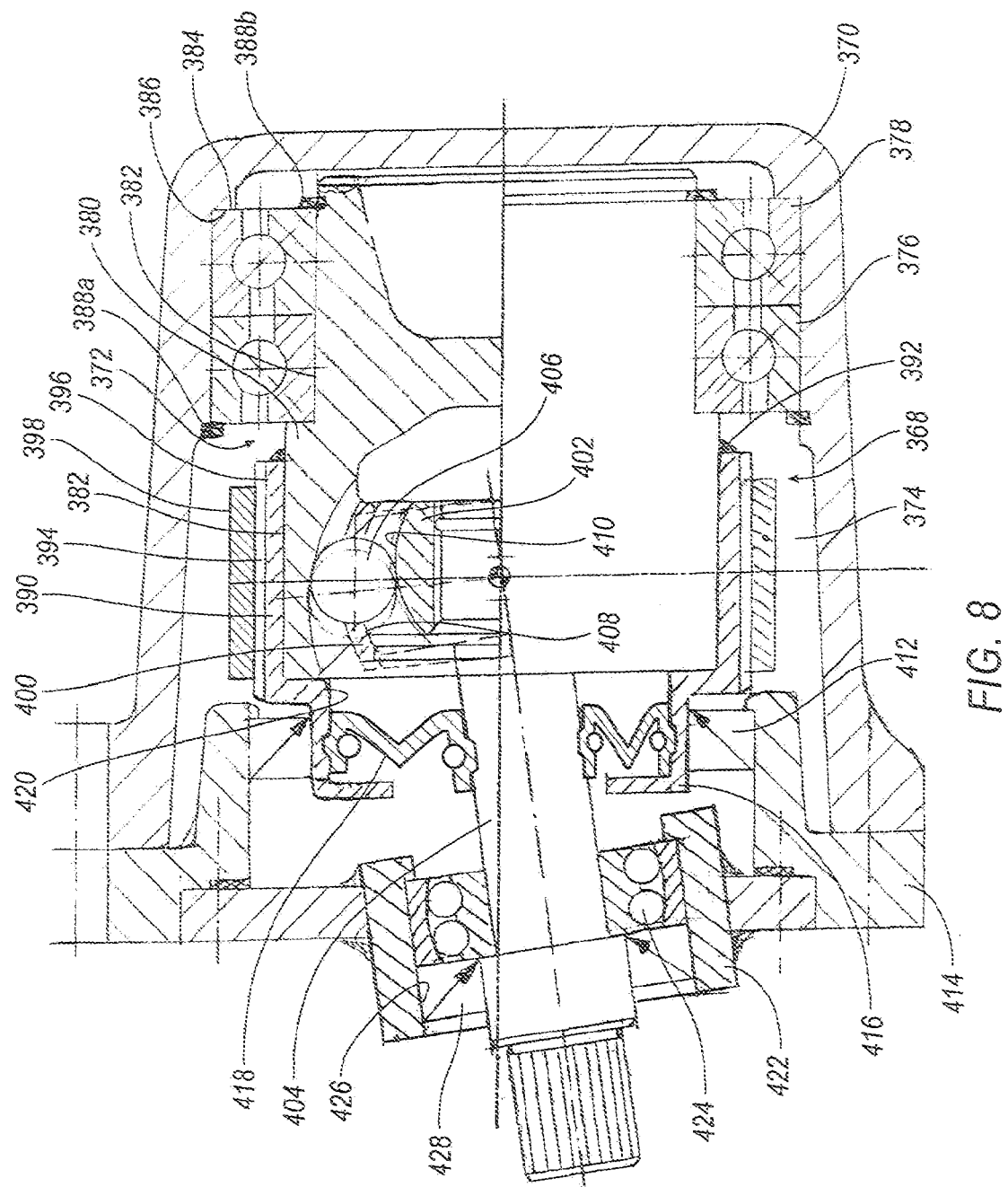
FIG. 8 shows an alternative embodiment of a constant velocity joint positioned within the transfer case according to the present invention.

FIG. 8 shows yet another alternate embodiment of a fixed constant velocity joint 368 mounted in a transfer case 370 in accordance with the present invention. Constant velocity joint 368 includes an outer race 372. Outer race 372 is preferably a solid piece such that there are no openings or passageways that are connected to or in communication with an interior chamber 374 of transfer case 370. Like other embodiments, outer race 372 is preferably constructed of a steel material, however it should be noted that any other metal material, hard plastic, composite or ceramic may also be used depending on the design and operational requirements of constant velocity joint 368 and the vehicle.

Outer race 372 is rotatably supported within transfer case 370 via a first and second set of bearings 376 and 378. First and second set of bearings 376 and 378 are abutted against a shoulder 380 on an outer surface 382 of the outer race 372 and a corresponding shoulder 384 on an interior surface 386 of transfer case 370. Ring type fasteners 388*a* and 388*b* also aid in securing first and second bearings 376 and 378 within transfer case 370.

Constant velocity joint 368 may also include a sprocket 390 that is attached to outer surface 382 of outer race 372 on an end opposite of first and second bearings 376 and 378. Sprocket 390 is attached via any known fastening mechanism such as chemical or mechanical. In the embodiment shown in FIG. 8, sprocket 390 is attached to outer race 372 by a weld 392. Sprocket 390 includes a plurality of teeth 394 on an outside surface 396 thereof.

A chain 398 is looped around the outside surface of sprocket 390 such that one end of the chain loop engages teeth 394. An opposite end of the chain loop connects to the input shaft (see, e.g., input shaft 52 in FIG. 2) of transfer case 370 via a second sprocket (see, e.g., sprocket 54, FIG. 2) connected thereto. Due to the chain/sprocket arrangement, constant velocity joint 368 will rotate at the input shaft speed.

It should be noted that other suitable drive mechanisms may be used in connection with constant velocity joint 368. Thus, the invention is not limited to the use of a chain and sprocket drive mechanism. Inline conventional type gear mechanisms, as shown in FIG. 3 or a bevel gear mechanism, as shown in FIG. 1 may also be employed.

Constant velocity joint 368 includes a roller cage 400 that is arranged within a bore of outer race 372 of constant velocity joint 368. Roller cage 400 includes a plurality of orifices through a surface thereof. An inner race 402 is arranged within roller cage 400 and includes a bore there through. The bore includes a plurality of splines or teeth on an inner surface thereof for connecting to an output shaft 404. Output shaft 404 and inner race 402 are rotatably fixed with respect to one another. A plurality of torque transmitting balls 406 are arranged between an inside surface 408 of outer race 372 and an outer surface 410 of inner race 402. Balls 406 are arranged within the orifices of roller cage 400 to ensure that balls 406 stay within the designated ball track on inner race 402 and outer race 372. It should be noted that while roller cage 400, balls 406, outer race 372 and inner race 402 are all preferably constructed from a steel material in one embodiment, it has been contemplated to use any other suitable metal material, ceramic, hard plastic or composite material for these parts within constant velocity joint 368.

Constant velocity joint 368 also includes a seal 412 that is positioned between a mounting bracket 414 of transfer case 370 and an end portion 416 of sprocket 390. A boot 418 is arranged between an inside surface 420 of end portion 416 of sprocket 390 and output shaft 404. Boot 418 is made of a pliable material such as urethane. Other suitable pliable materials, such as rubber, plastic, composites or fabric, may be used for boot 418, as well. Boot 418 is secured to output shaft 404 and inside surface 420 of sprocket 390 via any known fastener. Boot 418 shown in FIG. 8 will rotate with output shaft 404, constant velocity joint 368 and sprocket 390.

In accordance with another aspect of the invention, the embodiment shown in FIG. 8 also includes a hub 422. Hub 422 is fixed to mounting bracket 414 of transfer case 370 at a predetermined angle. Hub 422 includes at least one bearing 424 arranged between output shaft 404 and an inner surface 426 of hub 422. Hub 422 may further include a seal 428 that is positioned between inner surface 426 of hub 422 and output shaft 404. Hub 422 is adapted to be connected to mounting bracket 414 of transfer case 370 by any known chemical or mechanical bonding techniques at a predetermined angle which is generally desired between output shaft 404 and either the front differential or rear differential. This type of joint has only one departure angle capable of being used between transfer case 370 and the rear differential and front differential (not shown) and therefore are used for specific type applications where only one departure angle is needed or required for the drive system.

Figure 9:
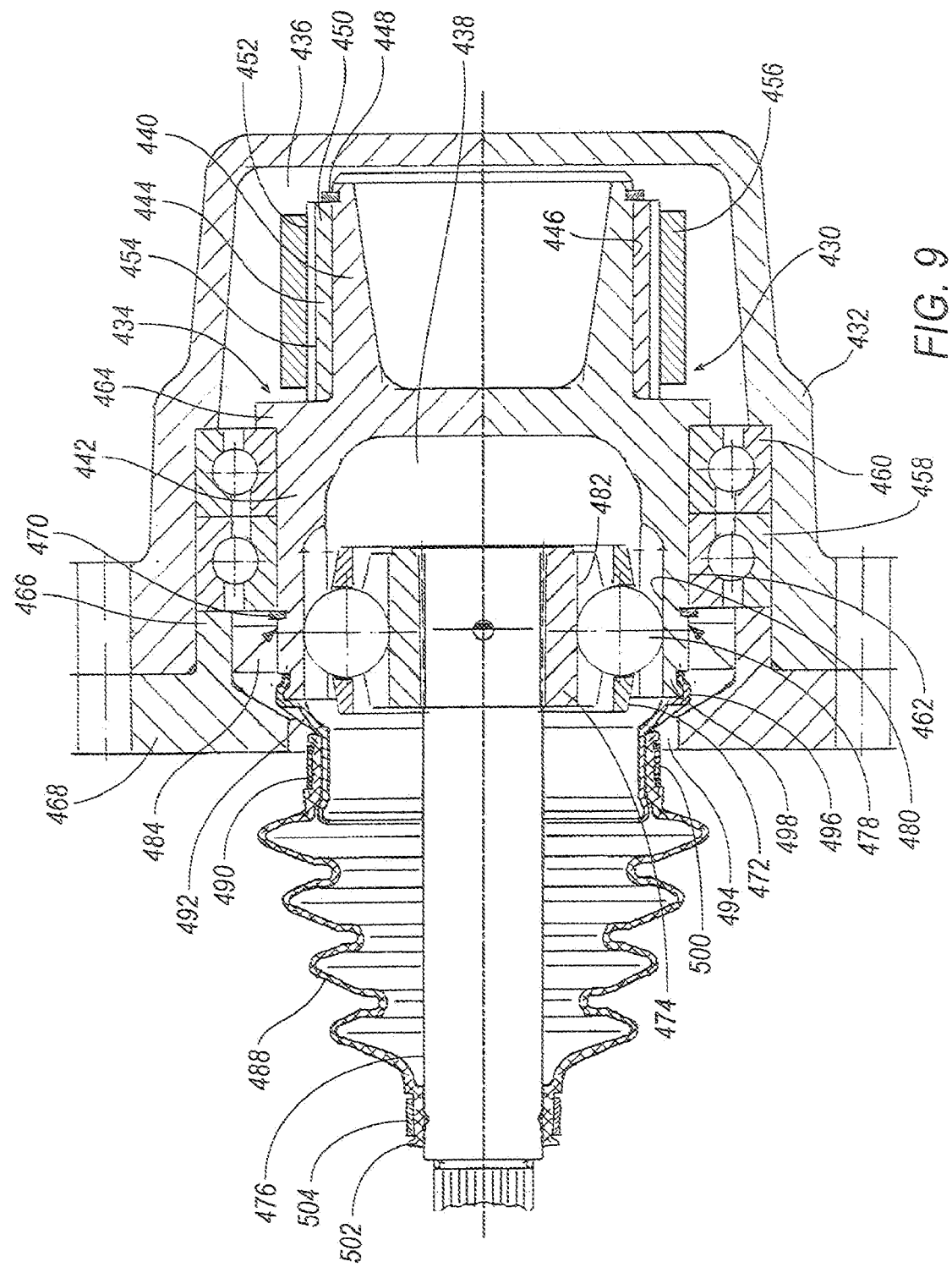
FIG. 9 is a cross section of a plunging constant velocity joint according to the present invention.
Figure 10:
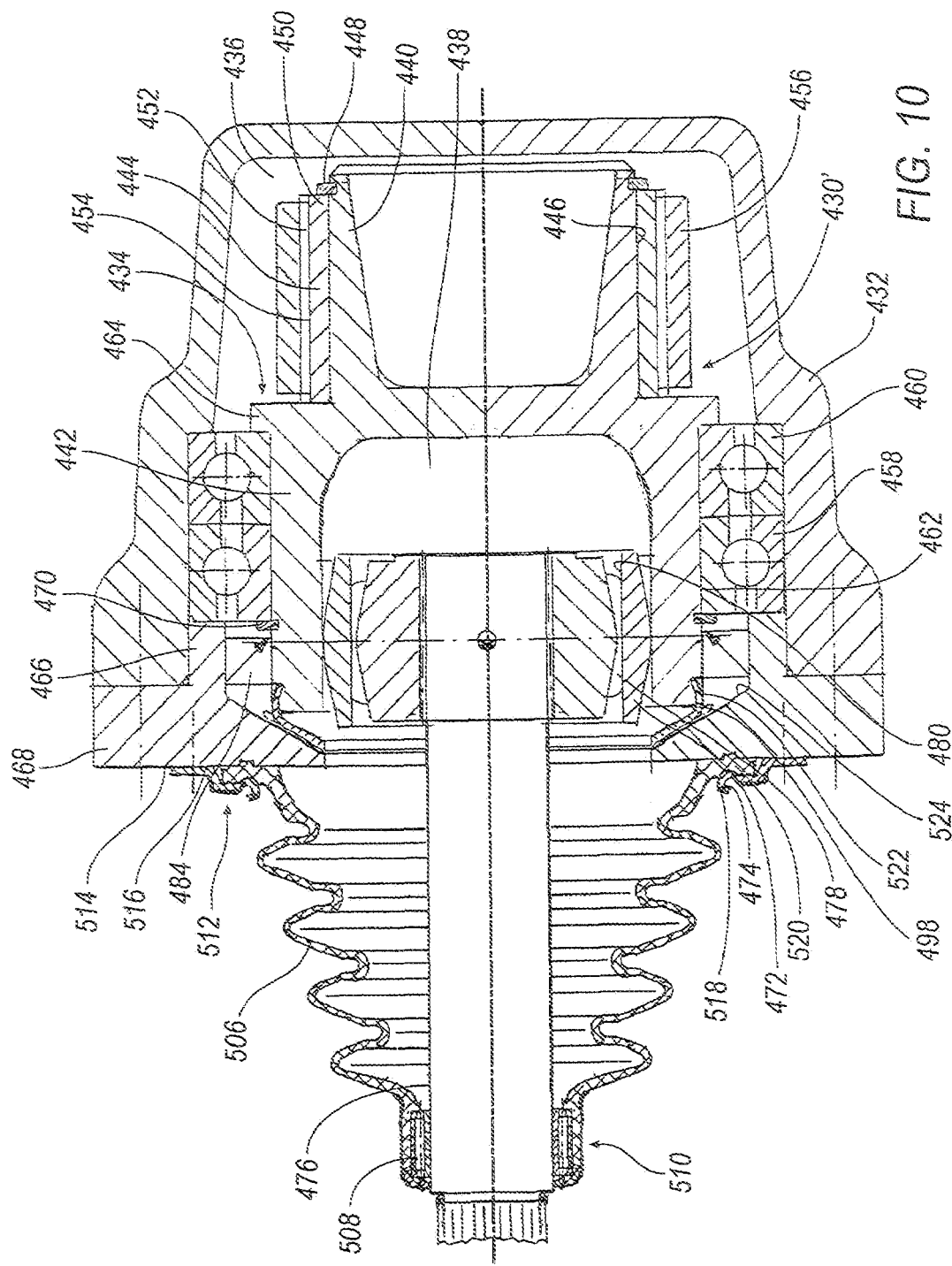
FIG. 10 is a cross section of an alternative embodiment of a plunging constant velocity joint positioned within a transfer case according to the present invention.

FIGS. 9 and 10 illustrate alternative embodiments that utilize a plunging type constant velocity joint 430 for use with a transfer case 432 in accordance with the present invention. It should be noted that plunging type constant velocity joint 430 may be used with any of the previous transfer case delivery systems as described above in connection with FIGS. 4-8.

Both FIGS. 9 and 10 illustrate a constant velocity plunging joint 430 having an outer race 434. Outer race 434 preferably includes a solid body such that no lubricating oil seeps from an inner chamber 436 of transfer case 432 into an inner chamber 438 of constant velocity joint 430. Outer race 434 further includes an extension portion 440 extending laterally from a main body portion 442 of outer race 434. A sprocket 444 is connected via any known mechanical or chemical bonding technique to an outer surface 446 of extension portion 440 of outer race 434. In the embodiment shown in FIGS. 9 and 10, sprocket 444 is attached to extension portion 440 by a snap ring 448 that is positioned on an end 450 of extension portion 440.

Sprocket 444 includes a plurality of teeth 452 on an outside surface 454 thereof. A chain 456 is looped around outside surface 454 of sprocket 444 such that one end of the chain loop engages teeth 452. An opposite end of the chain loop connects to the input shaft (see, e.g., input shaft 50 in FIG. 2) of transfer case 432 via a second sprocket (see, e.g., sprocket 52, FIG. 2) connected thereto. Due to the chain/sprocket arrangement, constant velocity joint 430 will rotate at the input shaft speed.

It should be noted that other suitable drive mechanisms may be used in connection with constant velocity joint 430. Thus, the invention is not limited to the use of a chain and sprocket drive mechanism. Inline conventional type gear mechanisms, as shown in FIG. 3 or a bevel gear mechanism, as shown in FIG. 1 may also be employed.

Constant velocity joint 430 is rotatably arranged within transfer case 432 via at least one bearing set such as first and second set of bearings 458 and 460. First and second set of bearings 458 and 460 are positioned on an outer surface 462 of outer race 434. A retaining lip 464 extending outwardly from outer surface 462 and cooperates with a positioning projection 466 that extends laterally from a mounting bracket 468 to keep first and second bearings 458 and 460 in position. First and second set of bearings 458 and 460 are sealed and held in place via a snap ring or other suitable fastener 470.

Constant velocity joint 430 further includes a roller cage 472 that is positioned within a bore of outer race 434 of constant velocity joint 430. Roller cage 472 includes a plurality of orifices through a surface thereof. An inner race 474 is arranged within roller cage 472 and includes a bore there through. The bore includes a plurality of splines or teeth on an inner surface thereof for connecting with an output shaft 476. Output shaft 476 and inner race 474 are rotatably fixed with respect to one another. A plurality of torque transmitting balls 478 are arranged between an inside surface 480 of outer race 434 and an outer surface 482 of inner race 474. Balls 478 are arranged within the orifices of roller cage 472 to ensure that balls 478 stay within the designated ball tracks on outer race 434 and inner race 474. While roller cage 472, balls 478, outer race 434 and inner race 474 are all preferably constructed of a steel material in the embodiments shown in FIGS. 9 and 10, it has been contemplated to use any other suitable metal material, ceramic, hard plastic or composite material for these parts within the constant velocity joint 430. The plunging constant velocity joint 430 allows for axial movement or plunging of output shaft 476 with respect to outer race 434. Balls 478 are capable of rolling within their respective tracks a predetermined distance. However, output shaft 476 is also capable of operating at predetermined departure angles while also plunging and moving in an axial direction.

Constant velocity joint 430 of FIGS. 9 and 10 also include a seal 484 positioned between outside surface 462 of outer race 434 and a portion of positioning projection 466 of mounting bracket 468 of transfer case 432.

In the embodiment shown in FIG. 9, a boot 488 is positioned around output shaft 476. Boot 488 includes an end portion 490 that is connected to a boot cover 492 that is positioned within an opening 494 of mounting bracket 468. A mounting end 496 of boot cover 492 is crimped or otherwise secured to an end 498 of outer race 434. End portion 490 is secured to boot cover 492 by a fastener 500 or by other suitable mechanical or chemical techniques. An opposite end 502 of boot 488 is secured to output shaft 476 via any known fastener 504.

FIG. 10 illustrates an alternative embodiment of a constant velocity joint 430' and is substantially the same as constant velocity joint 430 shown in FIG. 9. In FIGS. 9 and 10 like numbers illustrate like parts. However, constant velocity joint 430' includes an alternative embodiment of boot 506 that is non-rotating with respect to constant velocity joint 430'. In this embodiment, a needle bearing 508 is positioned between output shaft 476 and one end 510 if boot 506. An opposite end 512 of boot 506 is secured to an outer surface 514 of mounting bracket 468 of transfer case 432. A retaining portion 516 that is secured to mounting bracket 468 includes a lip 518 that is crimped over an annular end portion 520 of boot 506. Non-rotating boot 506 may also include a ring seal 522 that is positioned between end 498 of outer race 434 and an inside surface 524 of mounting bracket 468 of transfer case 432. Ring seal 522 serves to ensure that transfer case oil does not leak into inner chamber 438 of constant velocity joint 430.

Inner chamber 438 of constant velocity joint 430 is sealed and lubricated with grease therein. Because of ring seal 522, grease cannot be expelled into transfer case 432. Further, no transfer case lubricating oil is capable of leaking or being expelled into inner chamber 438 of constant velocity joint 430.

Figure 11:
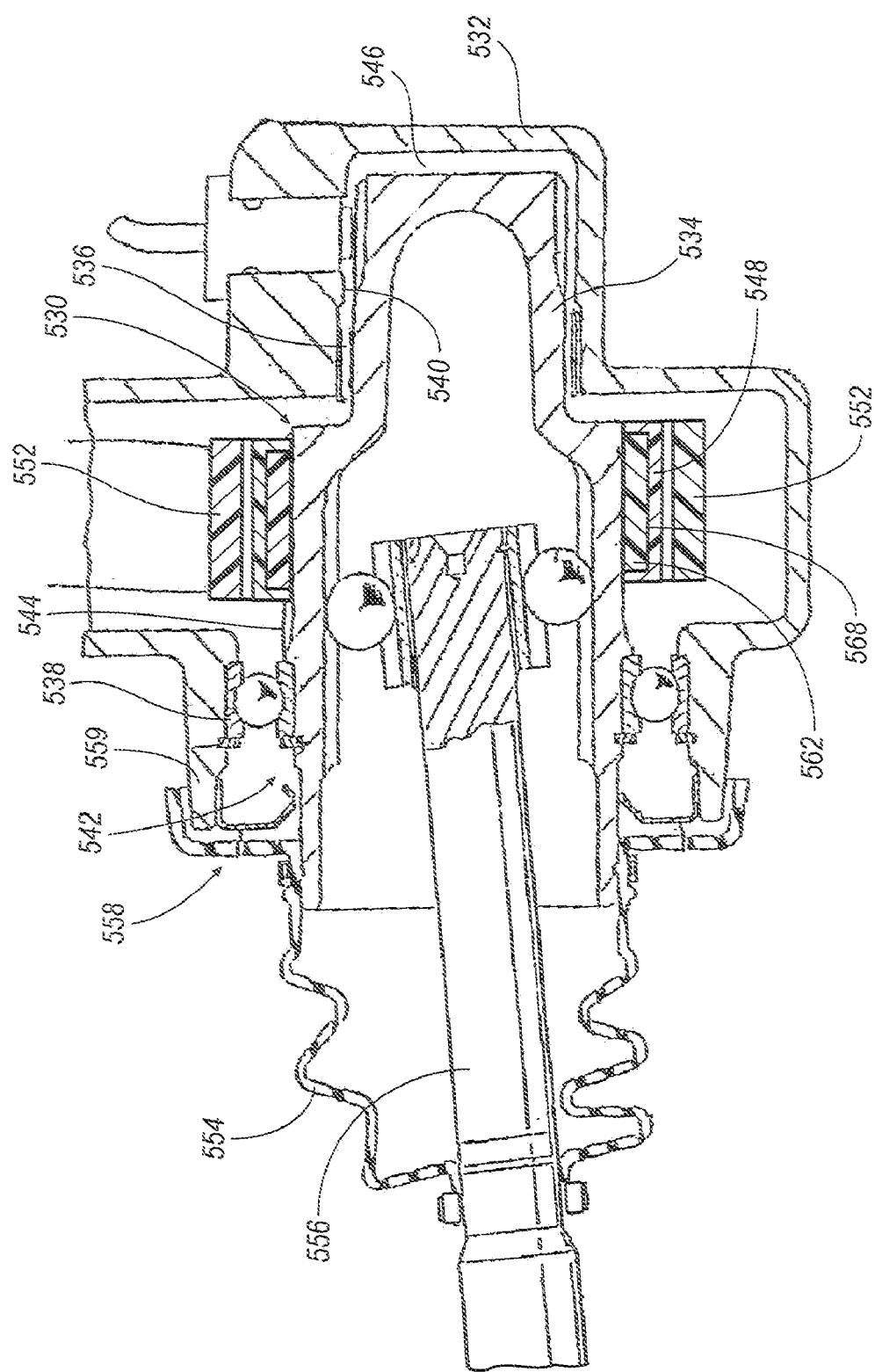
FIG. 11 is a cross section of an alternative embodiment of a plunging constant velocity joint incorporating a damping element in accordance with the present invention.

FIG. 11 illustrates an alternative embodiment of a plunging constant velocity joint 530 positioned within a transfer case 532 according to the present invention. Constant velocity joint 530 shares many of the same parts as constant velocity joint 430 and operates in the same manner. Constant velocity joint 530 includes an outer race 534 that is arranged and rotatably supported within transfer case 532 via a needle bearing 536 and a roller bearing 538 on opposite ends thereof. Needle bearing 536 is positioned within an interior wall 540 of transfer case 532. Roller bearing 538 is positioned on an opposite end 542 of outer race 534 and is sandwiched between interior wall 540 of transfer case 532 and an outer surface 544 of outer race 534.

In accordance with one aspect of the invention, outer race 534 is a solid piece such that it has no openings or passageways in communication with an inner chamber 546 of transfer case 532. Accordingly, no grease can seep into inner chamber 546 of transfer case 532, which is lubricated with oil.

In accordance with another aspect of the invention, a sprocket 548 is positioned around outer surface 544 of outer race 534. As described above in connection with other embodiments of the invention, sprocket 548 includes a plurality of teeth that engages a chain 552. Chain 552 connects to the input shaft (not shown).

In accordance with another aspect of the invention, constant velocity joint 530 also includes a boot 554. Boot 554 is positioned around an output shaft 556 and fixed thereto. Boot 554 has an end portion 558 that fixed to outer race 534. Boot 554 rotates with output shaft 556 and outer race 534.

Constant velocity joint 530 may also include a damper 562 that is positioned between outer surface 544 of outer race 566 and an inner surface 568 of sprocket 548. Damper 562, which is preferably constructed of rubber or other suitable material, ensures more efficient and quiet operation of transfer case 532. Indeed, damper 562 allows for quieter operation and removal of imperfections during the transfer of torque within the transfer case system. The reduction of vibrations and noise will further decrease any warranty issues of transfer case 532 in the automotive environment.

Figure 12:
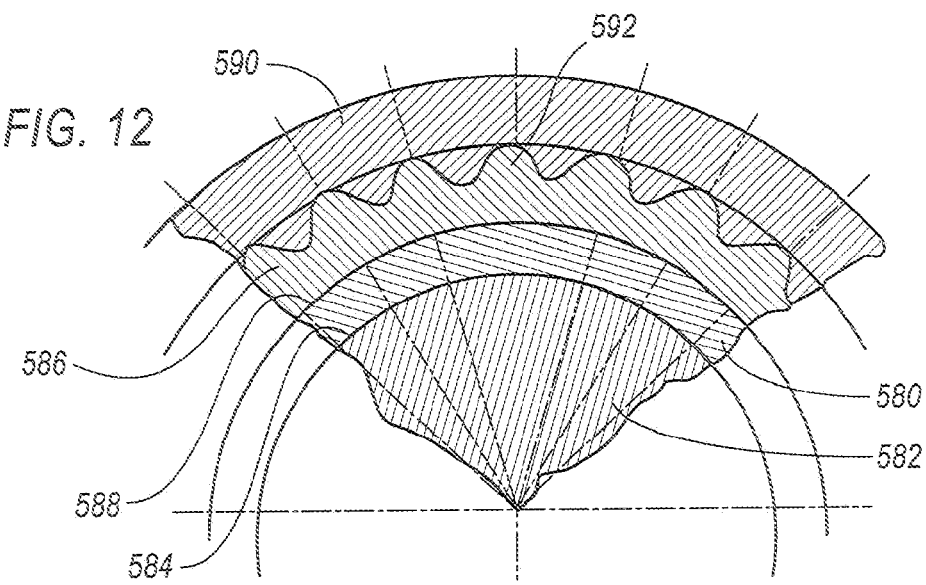
FIG. 12 is a partial cross section of a dampening system for use with the present invention.

FIG. 12 illustrates an embodiment of a damping element 580 for use in the constant velocity joints (12, 51, 90, 150, 204, 284, 368, 430, 530) described previously herein in connection with FIGS. 1-11. In this embodiment, an outer race 582 of the constant velocity joint is cushioned by damping element 580 that is positioned around an outside surface 584 of outer race 582. In one embodiment, damping element 580 has a generally ring like shape.

A sprocket 586 (or a bevel gear or drive gear) is positioned around an outside surface 588 of damping element 580. A chain 590 (in the case of a chain and sprocket drive mechanism) or other gear (in the case of a bevel gear or drive gear drive mechanism) is connected to teeth 592 or other engaging mechanism formed on the outside surface of sprocket 586. Damping element 580 is preferably made of a rubber material, which is cost-effective, yet durable. However, it is understood that other suitable material may be employed for damping element 580. Examples of such suitable materials include, but are not limited to, soft or hard plastics, rubbers, composite or fabrics. Damping element 580 serves to increase efficiency while removing vibrations and noise from operation of the transfer case. Removal of vibrations and other inefficiencies from the constant velocity joint will ensure quieter operation and more efficient operation of the transfer case.

Figure 13:
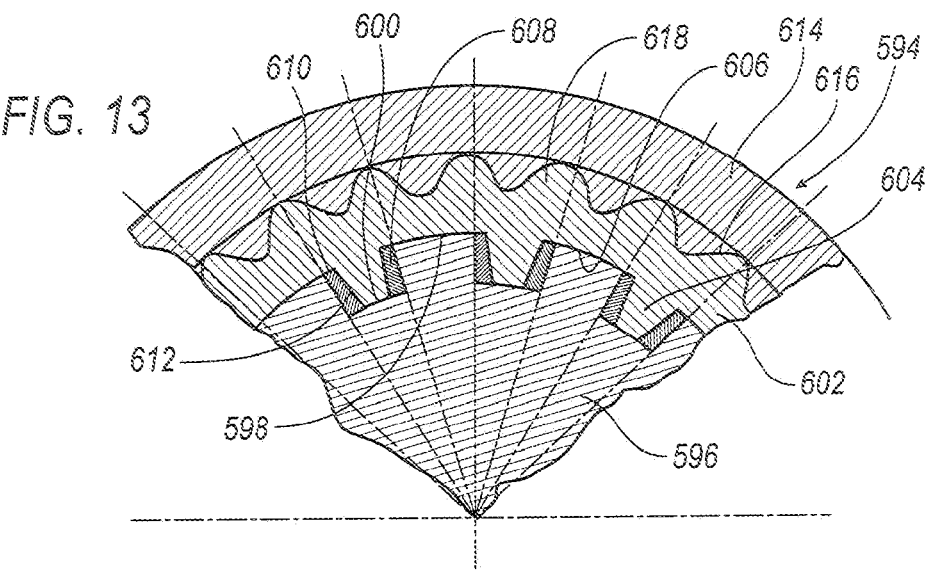
FIG. 13 is a partial cross section of an alternative embodiment of a dampening system according to the present invention.

FIG. 13 depicts an alternative embodiment of a damping system 594 for use with a constant velocity joint (12, 51, 90, 150, 204, 284, 368, 430, 530) in accordance with the present invention. An outer race 596 of the constant velocity joint includes a plurality of teeth 598 extending from an outer surface 600 thereof. A sprocket 602 having a plurality of teeth 604 extending from an inner surface 606 thereof, is positioned within the constant velocity joint such that teeth 604 of sprocket 602 are interengaged with teeth 598 of outer race 596. In accordance with one aspect of the invention, teeth 604 of sprocket 602 are sized so as to be smaller than a gap that is formed between adjacent teeth 598 of outer race 596. Accordingly, when teeth 604 are interengaged with teeth 598, a clearance is formed between adjacent sidewalls 610, 612 of teeth 598, 604, respectively. A damping element 608 is positioned between each adjacent sidewall 610, 612. A chain 614 is positioned around an outside surface 616 of sprocket 602 and engages with teeth 618 formed on outside surface 616 of sprocket 602. Chain 614 connects to an input shaft to drive outer race 596.

Figure 14:
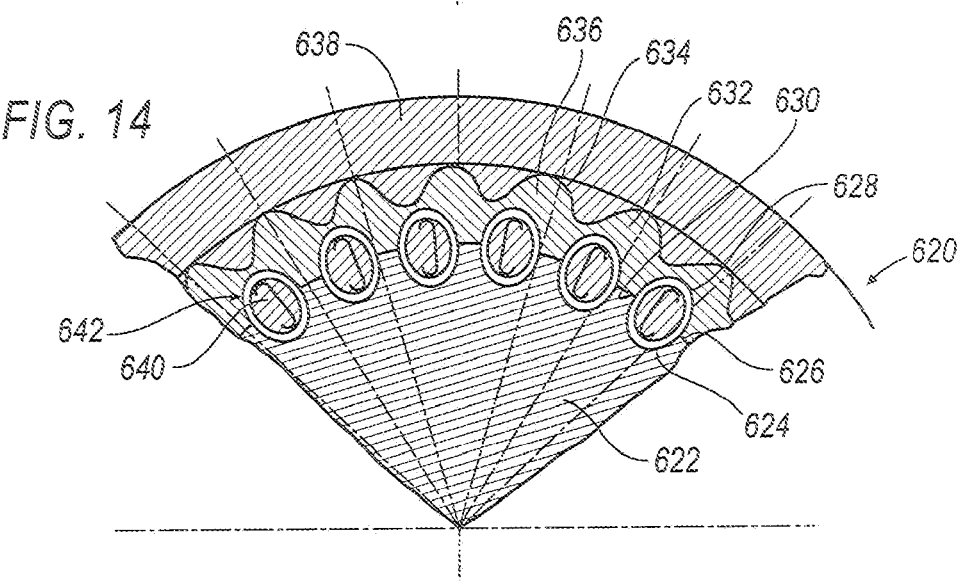
FIG. 14 is a partial cross section of another alternative embodiment of a dampening system for use with the present invention.

FIG. 14 illustrates another alternative embodiment of a damping system 620 for use with a constant velocity joint (12, 51, 90, 150, 204, 284, 368, 430, 530) in accordance with the present invention. In damping system 620, an outer race 622 includes a plurality of half circular shaped channels 624 formed on an outer surface 626 and arranged in an axial direction thereof. A corresponding plurality of half circular shaped channels 628 are arranged in an axial direction on an inner surface 630 of a sprocket 632 that is positioned around outer race 622. In one embodiment, an outer surface 634 of sprocket 632 includes a plurality of teeth 636 that are adapted to engage with a chain 638. Chain 638 connects to an input shaft (not shown).

In accordance with one aspect of the invention, a spring 640 is arranged within an orifice 642 that defined by circular channels 624, 628 on both inner surface 630 of sprocket 632 and outer surface 626 of outer race 622. Spring 640 preferably has a general C-shape such that spring 640 will be biased in an outward direction thus creating a stronger and tighter fit between sprocket 632 and outer race 622, and reducing any vibration and noise associated with the constant velocity joint rotation. While it is preferred that spring 640 is constructed of metal, it should be noted that spring 640 may be constructed any other type of ceramic, rubber, plastic or fabric.

Figure 15:
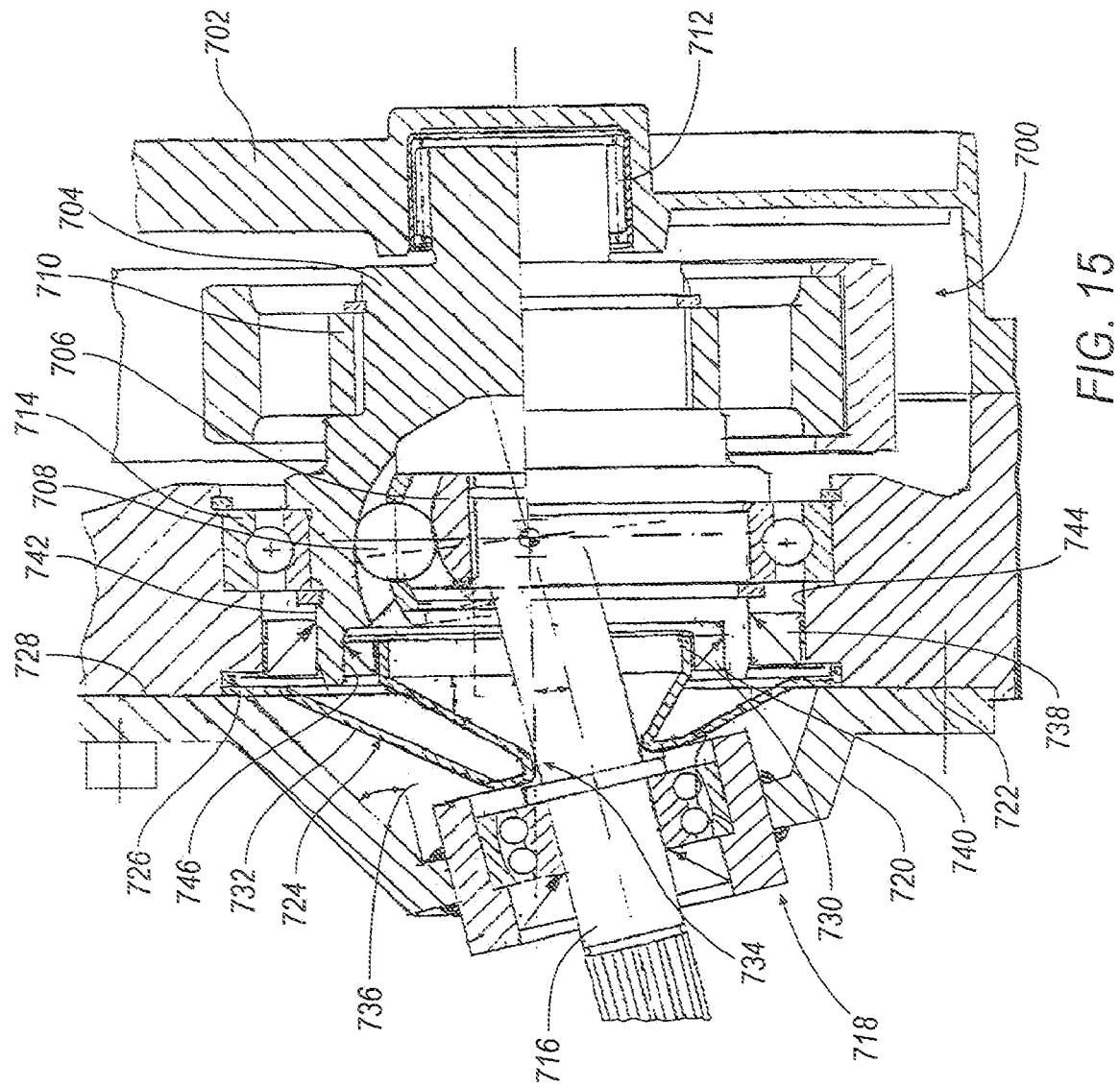
FIG. 15 is a cross section of an alternative embodiment of a constant velocity joint incorporating a hub in accordance with the present invention.

FIG. 15 illustrates an alternative embodiment of a fixed constant velocity joint 700 in accordance with the present invention. Constant velocity joint 700 is similar to that as described above for FIG. 8. For example, constant velocity joint 700 is positioned within a transfer case 702 and includes an outer race 704, an inner race 706 and torque transmitting balls 708 that cooperate with inner race 706 and outer race 704. A sprocket 710 is positioned around outer race 704 and cooperates with a first and second set of bearings 712 and 714 to drive an output shaft 716 that is operatively connected to inner race 706.

In accordance with one aspect of the invention constant velocity joint 700 further includes a hub 718 that is mechanically or chemically secured to a cover 720. Cover 720 is secured to an outside surface 722 of transfer case 702 by any suitable mechanism, such as a removable fastener. A boot 724 is positioned around shaft 716 and connected to transfer case 702. A first end 726 of boot 724 is arranged adjacent an inside surface 728 of cover 720 and attached to transfer case 702. A second end 730 of boot 724 is arranged inboard of first end 726, within transfer case 702. Boot 724 further has a body portion 732 that changes direction such that a sealing lip area 734 is formed. Sealing lip area 734 contacts output shaft 716.

Constant velocity joint 700 also includes one or more seal members 738 and 740. First seal member 738 is positioned between an outside surface 742 of outer race 704 and an interior surface 744 of transfer case 702. Second seal 740 is positioned between an interior surface 746 of outer race 704 and second end 730 of boot 724. Boot 724 and first and second seals 738 and 740 cooperate to ensure that oil and grease do not leak out of transfer case 702 into a chamber 736 that is positioned between constant velocity joint 700 and cover 720. It should be noted that the embodiment shown in FIG. 15 is designed to be fixed at a predetermined angle which is desired between output shaft 716 and the front or rear differential (not shown).

Figure 16:
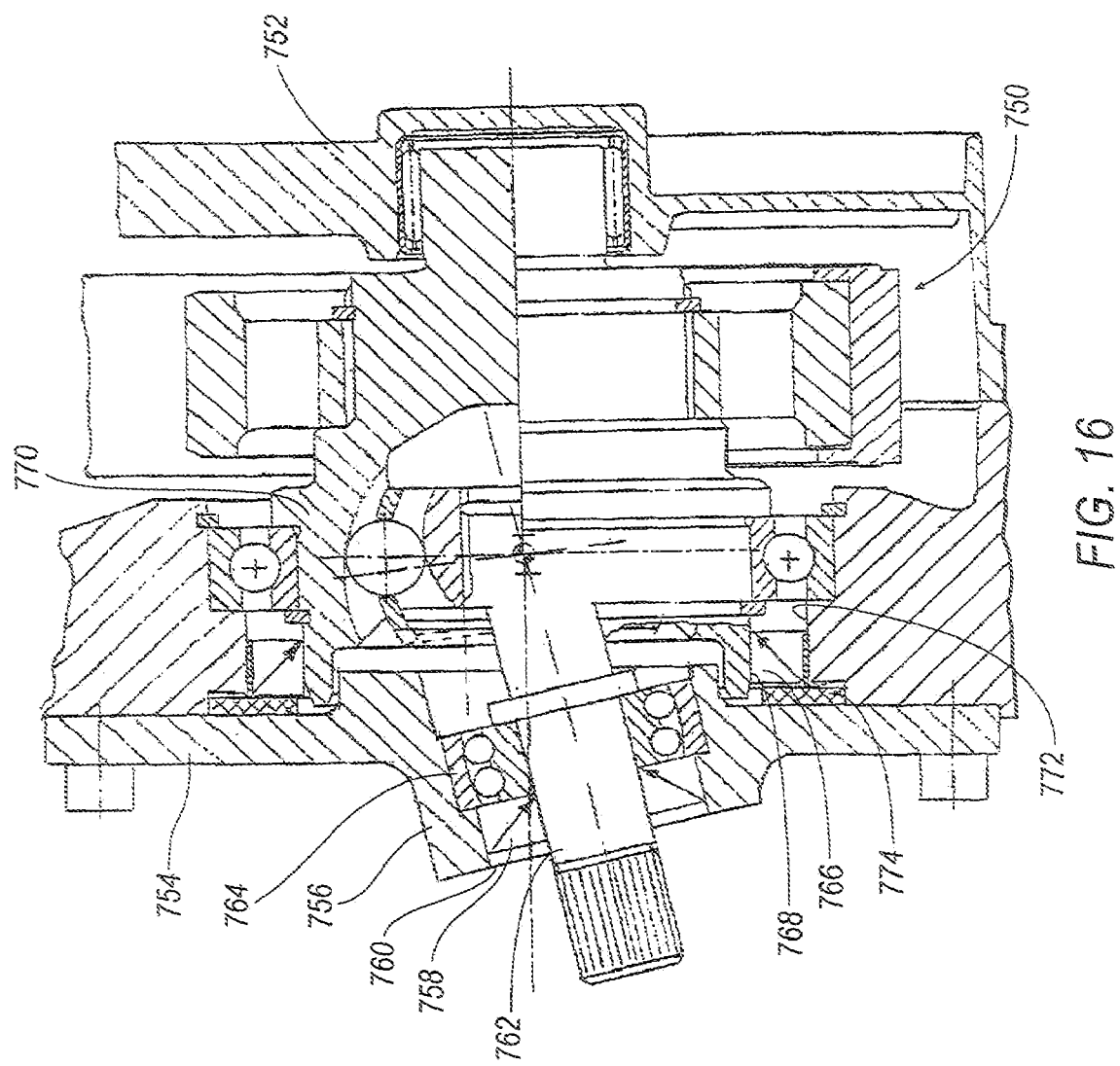
FIG. 16 is a cross section of a constant velocity joint of FIG. 15 with an alternative hub design in accordance with the present invention.

FIG. 16 illustrates another alternative embodiment of a fixed constant velocity joint 750 that is arranged within a transfer case 752 in accordance with the present invention. Constant velocity joint 750 shown in FIG. 16 is generally similar to that shown in FIGS. 8 and 15 above. However, the embodiment shown in FIG. 16 includes a one-piece cover or mounting bracket 754 that includes an integral hub 756 that is formed, cast or manufactured therein to create a single unit.

Hub 756 includes a seal 758 that is positioned between an inner surface 760 of hub 756 and an output shaft 762 extending through hub 756, adjacent bearings 764. Seal 758 operates to ensure that no contaminates enter or no lubricant leaks from constant velocity joint 750 positioned within transfer case 752.

Constant velocity joint 750 also includes a seal 766 positioned between an outside surface 768 of an outer race 770 and an inner surface 772 of transfer case 752. Another seal 774 is positioned between mounting bracket 754 and transfer case 752 to ensure no leakage of oil from transfer case 752. As discussed above for FIG. 8 and FIG. 15, the embodiment shown in FIG. 16 is fixed at a predetermined angle defined between output shaft 762 and either a front differential or rear differential (not shown). Therefore, this design allows one output angle between the transfer case 752 and the differentials and therefore is used for specific type applications where only one departure angle is needed or required for the drive system.

Figure 17:
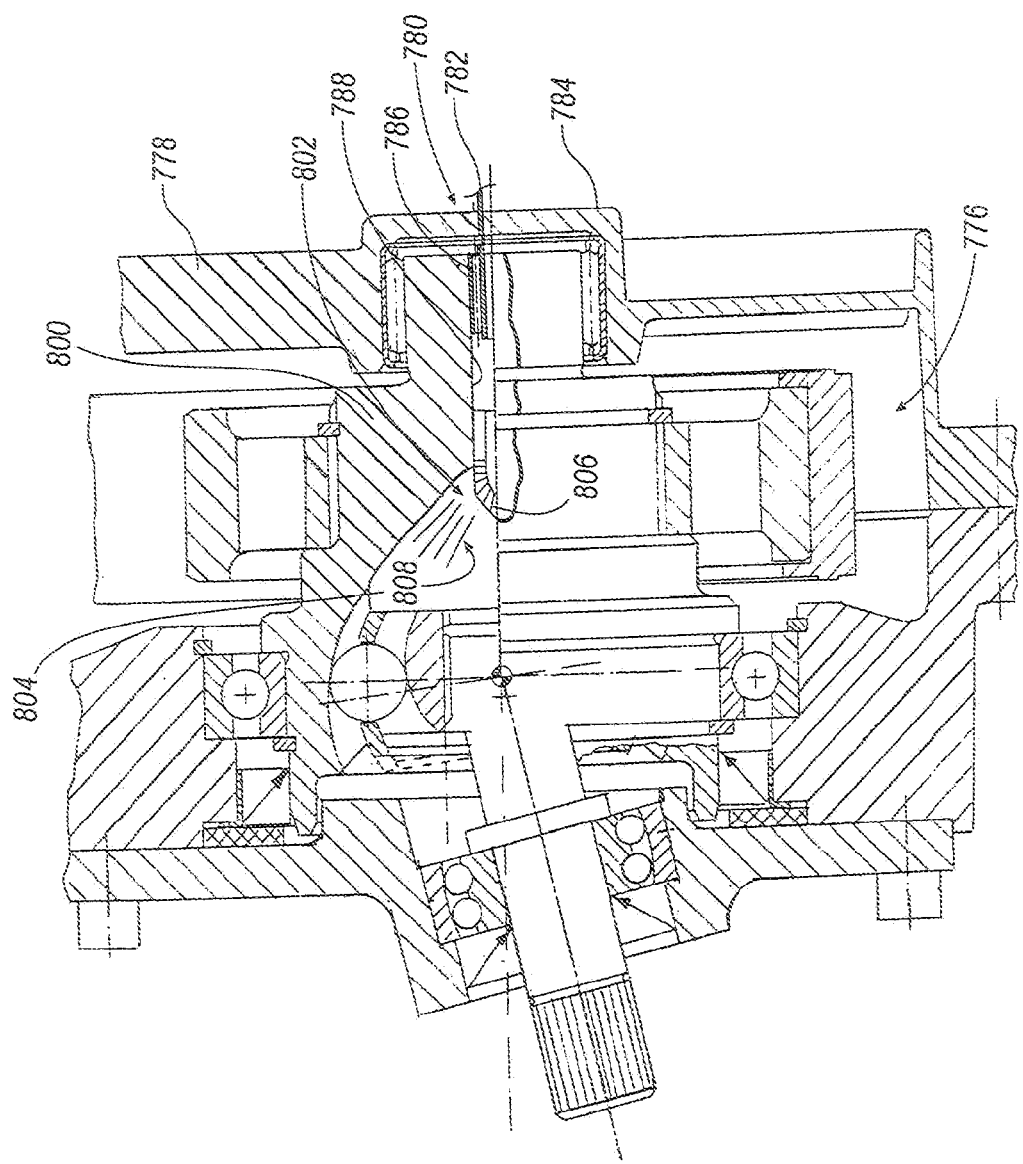
FIG. 17 shows an alternative embodiment of a constant velocity joint that includes a lubricating system according to the present invention.

FIG. 17 illustrates another alternative embodiment of a fixed constant velocity joint 776 that is used in a transfer case 778 in accordance with the present invention. Constant velocity joint 776 shown in FIG. 17 is generally similar as that shown in FIG. 16 and as described above. However, unlike constant velocity joint 750 of FIG. 16, constant velocity joint 776 further includes a lubricating system 780. Lubricating system 780 includes a tube 782 (shown in partial cross-section), which extends outwardly and away from an end 784 of transfer case 778. A needle bearing 786 is positioned between tube 782 and an inner surface 788 of an outer race 800 of constant velocity joint 776.

Lubricating system 780 also includes a nozzle 802. Nozzle 802 is positioned at one end of tube 782 within an interior chamber 804 of constant velocity joint 776. Nozzle 802 further includes a plurality of orifices 806 formed therein. Orifices 806 permits lubricating oil from tube 782 to be released in an oil mist, represented as 808 to lubricate the internal components of constant velocity joint 776 attached to transfer case 778. An oil air mixture is received from a pump (not shown) through tube 782, which then lubricates via nozzle 802 to create the oil mist to properly lubricate constant velocity joint 776.

Figure 18:
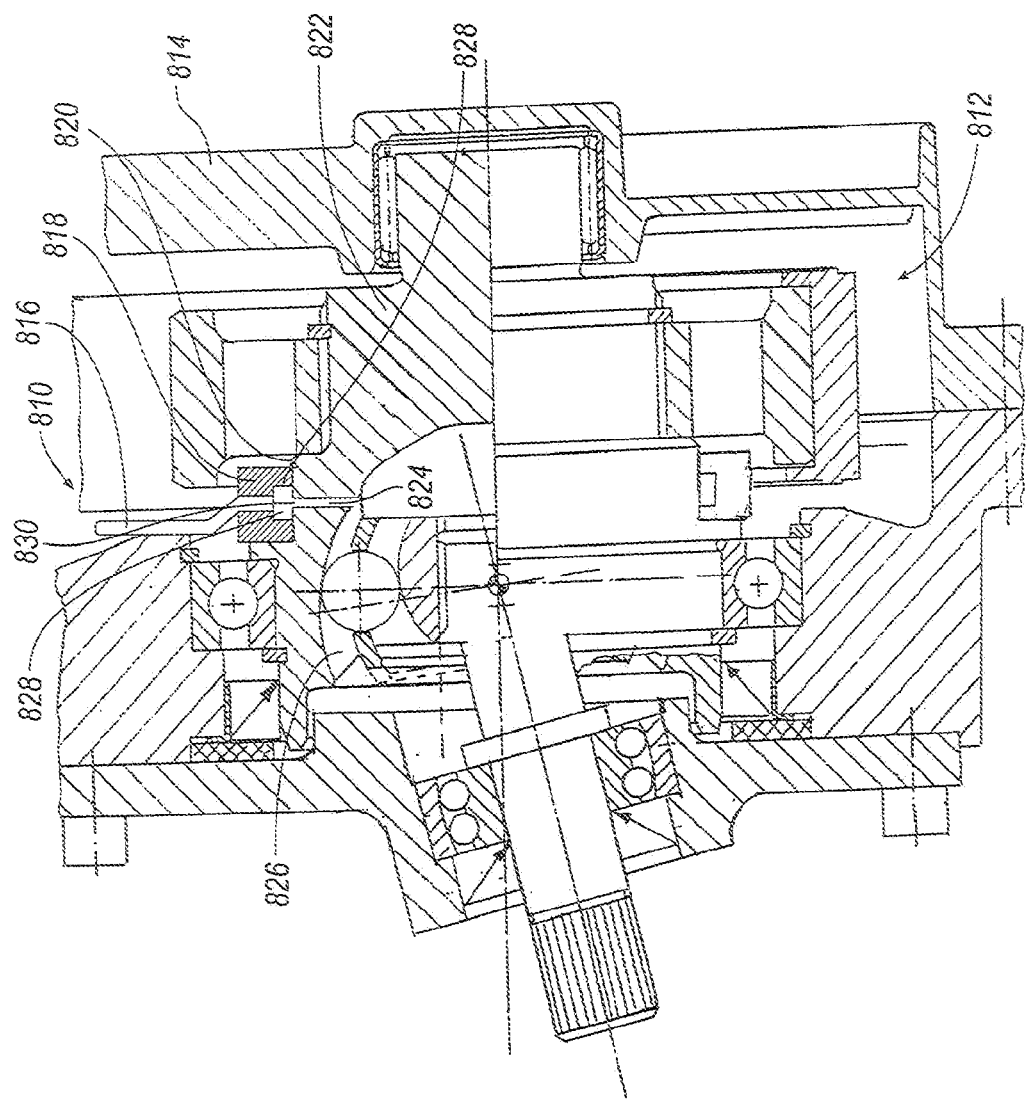
FIG. 18 is a cross section of a constant velocity joint that includes an alternative lubricating system according to the present invention.

FIG. 18 is an alternative embodiment of a lubricating mechanism 810 for use in a constant velocity joint 812 that is used in a transfer case 814. Constant velocity joint 812 is of a similar construction as constant velocity joints 750 and 776 of FIGS. 16-17. However, in this embodiment, an oil air mixture is received from a pump (not shown) that is located remotely of constant velocity joint 812. Lubricating mechanism 810 includes a tube 816 that is fixed to a cap 818. Cap 818 is fixed to an outer surface 820 of an outer race 822 of constant velocity joint 812. Cap 818 is arranged over a channel 824 that extends through outer race 822 and is open to an inner chamber 826 of constant velocity joint 812. Accordingly, tube 816 is fluidly connected to inner chamber 826. In accordance with the invention, an oil air mixture from the pump will be passed through tube 816 and cap 818 and into channel 824 such that it will be delivered into inner chamber 826 to provide cooling and lubrication for constant velocity joint 812 during operation. It is also preferred that cap 818 includes a circumferential notch 828 formed adjacent to an opening 830 of channel 824 formed through outer surface 820 of outer race 822 to prevent clogs and provide for even flow of the oil air mixture.

Figure 19:
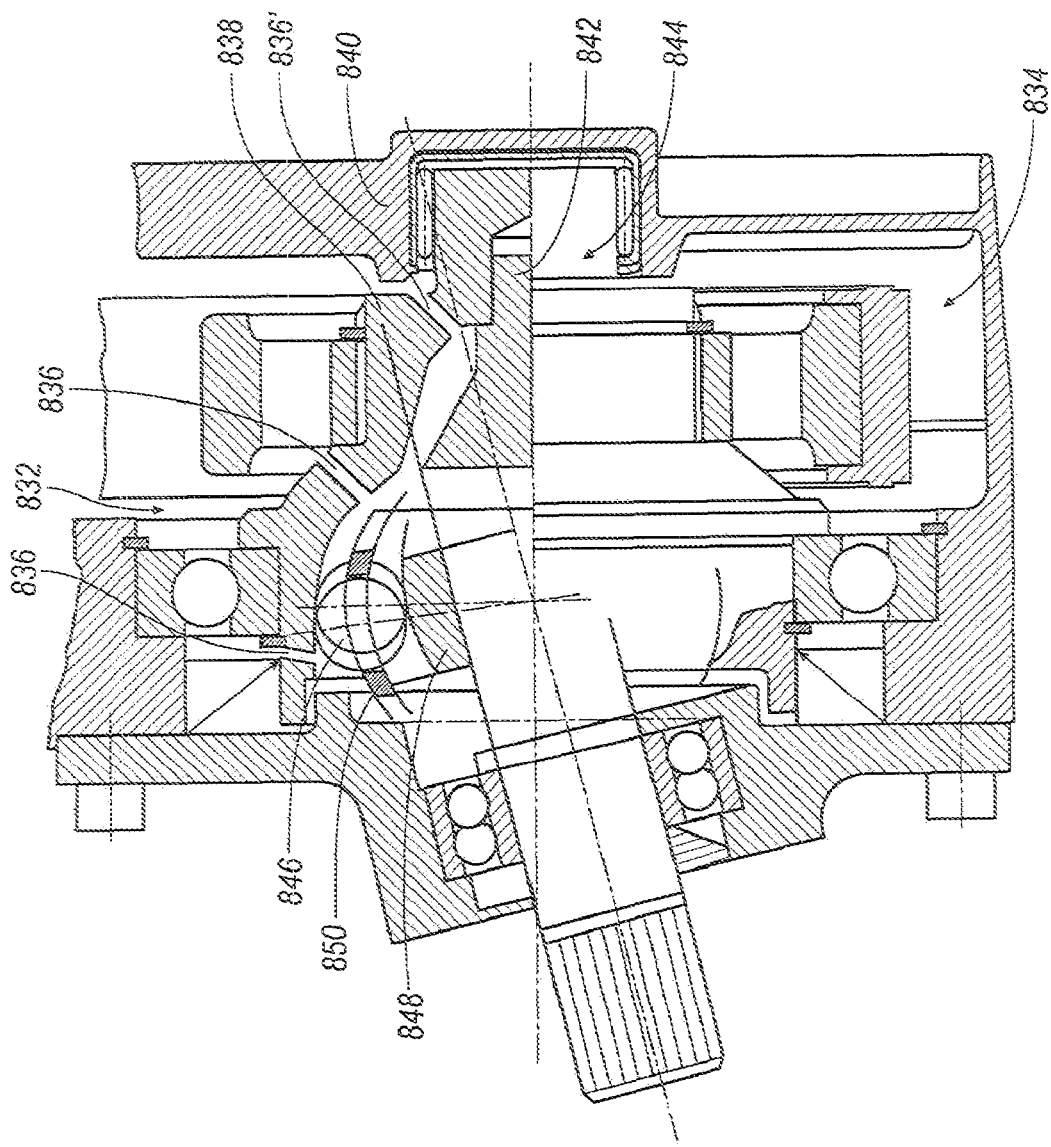
FIG. 19 is a cross section of a constant velocity joint that includes another alternative embodiment of a lubricating system according to the present invention.

FIG. 19 illustrates yet another alternative embodiment of a lubrication system 832 to lubricate a constant velocity joint 834 in accordance to the present invention. In this embodiment lubrication system 832 includes a plurality of lubrication channels 836 that extend through an outer race 838 of constant velocity joint 834. Channels 836 permit inflow and outflow of oil to the internal components of constant velocity joint 834. Permitting oil flow will allow the lubricant to reach bearings and create a lubrication zone for the entire constant velocity joint 834 within a transfer case 840.

In accordance with one aspect of the invention, a cone like directional device 842 is arranged within an end 844 of outer race 838. Cone-like directional device 842 serves to direct the oil flow in an outward direction towards a rolling mechanism 846, inner race 848, and roller cage 850 where lubrication is most needed. One of the lubrication oil channels 836' feeds the lubrication oil to the spinning cone directional device 842 which will move the incoming oil in an outward direction towards inner race 848, balls 846, bearings and other components of constant velocity joint 834.

FIGS. 20-24 show alternative embodiments for supporting an outer race 852 of any of the above-identified constant velocity joints according to the present invention. All embodiments will use the same reference numerals for like parts.

Figure 20:
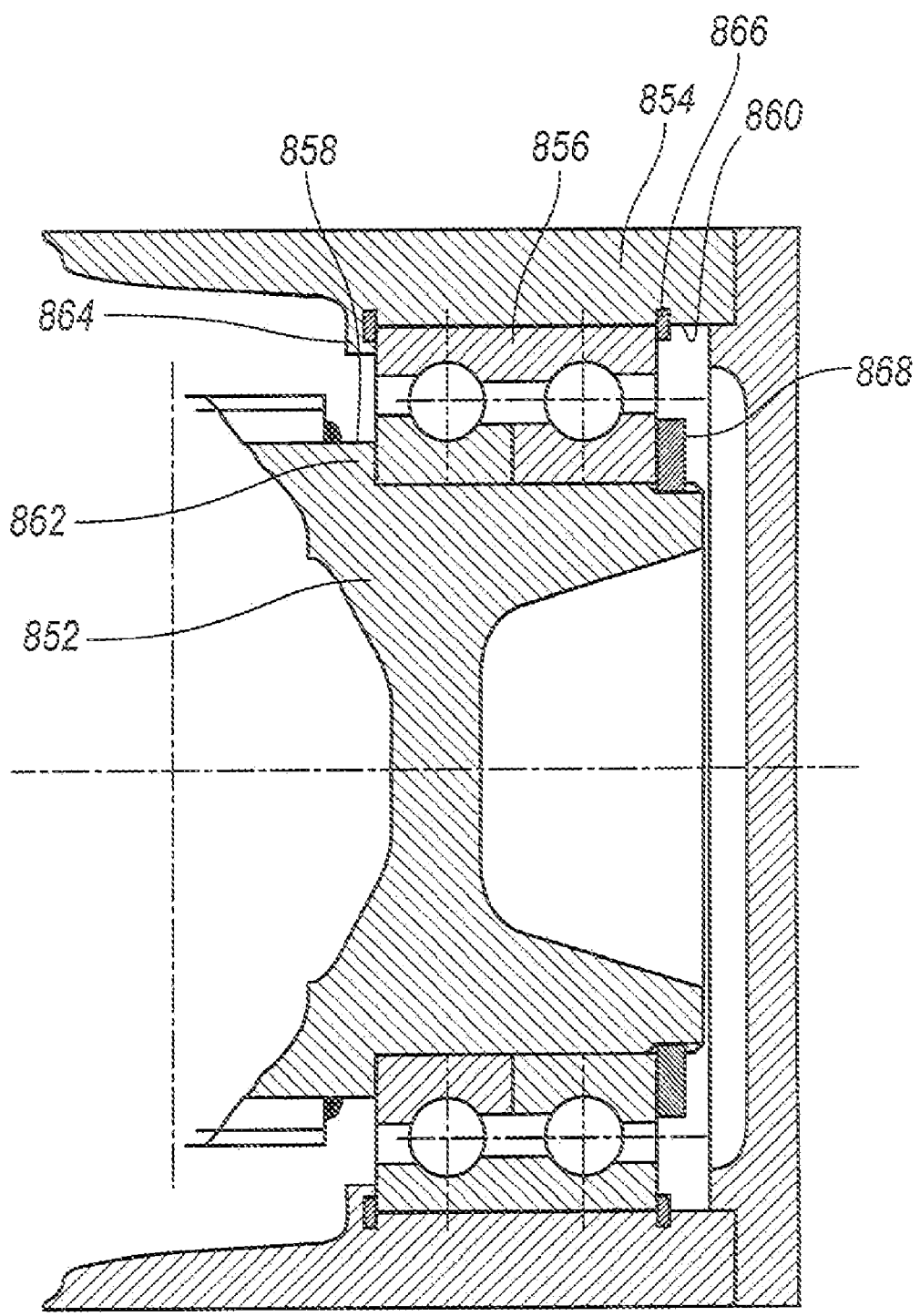
FIGS. 20-24 illustrate alternative embodiments of a support for an outer race of a constant velocity joint according to the present invention.

In a first embodiment, as shown in FIG. 20, outer race 852 is supported within a transfer case 854 by a pair of bearings 856. Bearings 856 are positioned between an outer surface 858 of outer race 852 and an interior surface 860 of transfer case 854. Outer race 852 includes a shoulder 862 against which one of bearings 856 abut. Transfer case 854 also includes a shoulder 864 against which a top portion of one of the bearings 856 abut. A ring fastener 866 is preferably connected to transfer case 854 to assist in retaining bearings 856 within transfer case 854. A collar 868 may also be provided that abuts a lower portion of one of the bearings 856.

Figure 21:
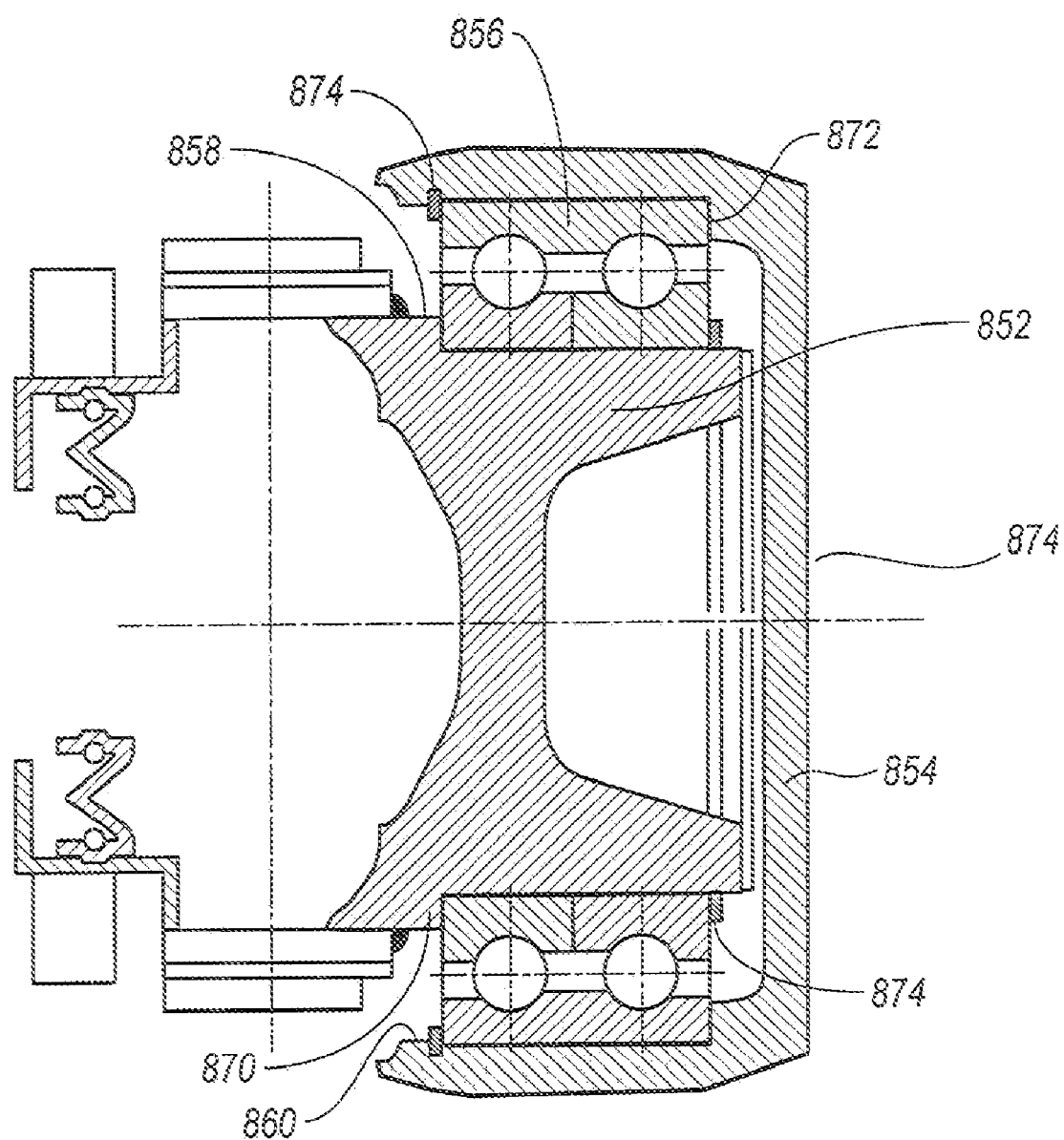

In a second embodiment, as shown in FIG. 21, bearings 856 are retained between outer race 852 and transfer case 854 by cooperating shoulders 870 and 872. First shoulder 870 is formed on outer surface 858 of outer race 852. Second shoulder 872 is formed on interior surface 860 of transfer case 854. Ring fasteners 874 secure the remaining corners of bearings 856.

Figure 22:
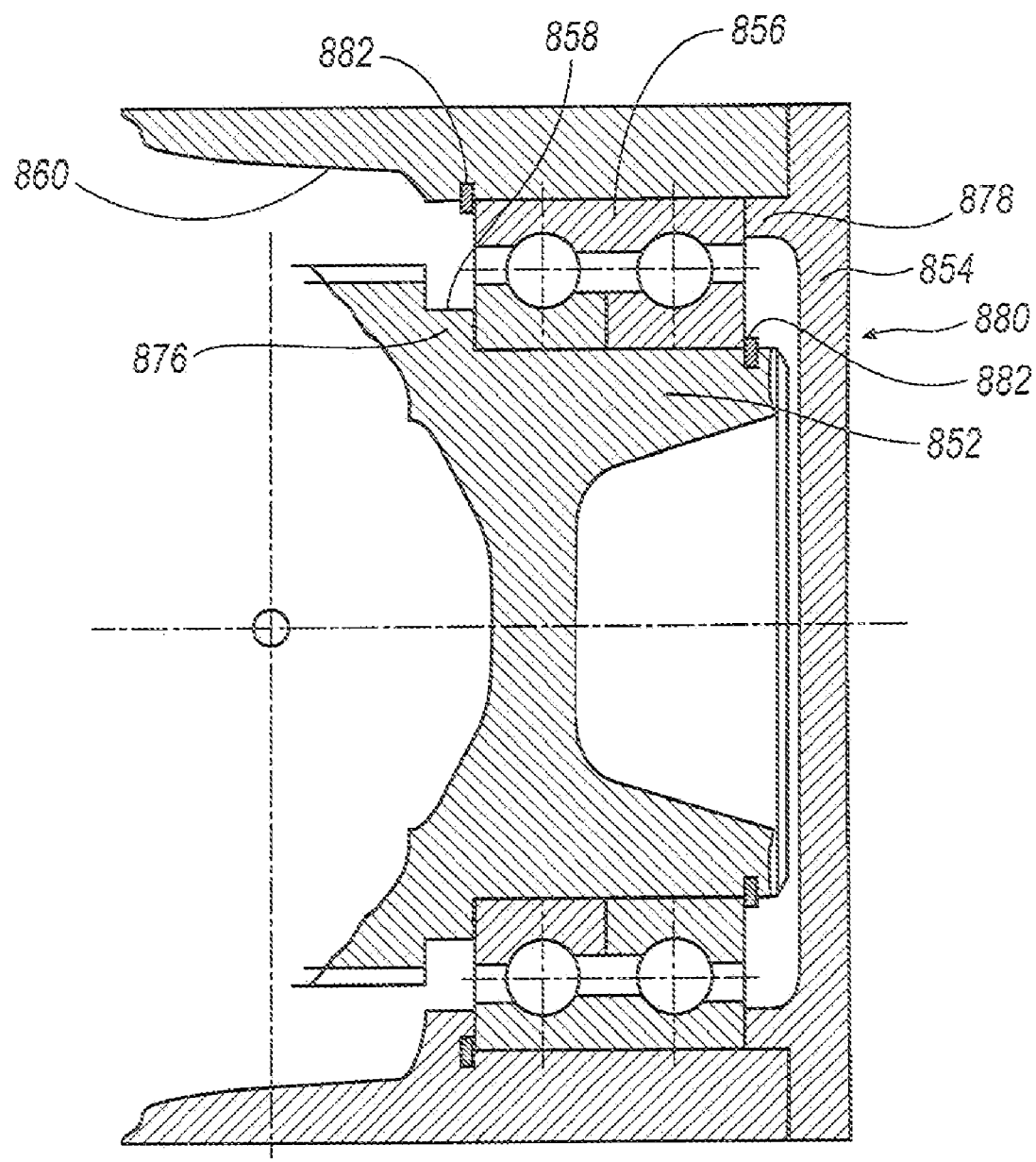
Figure 23:
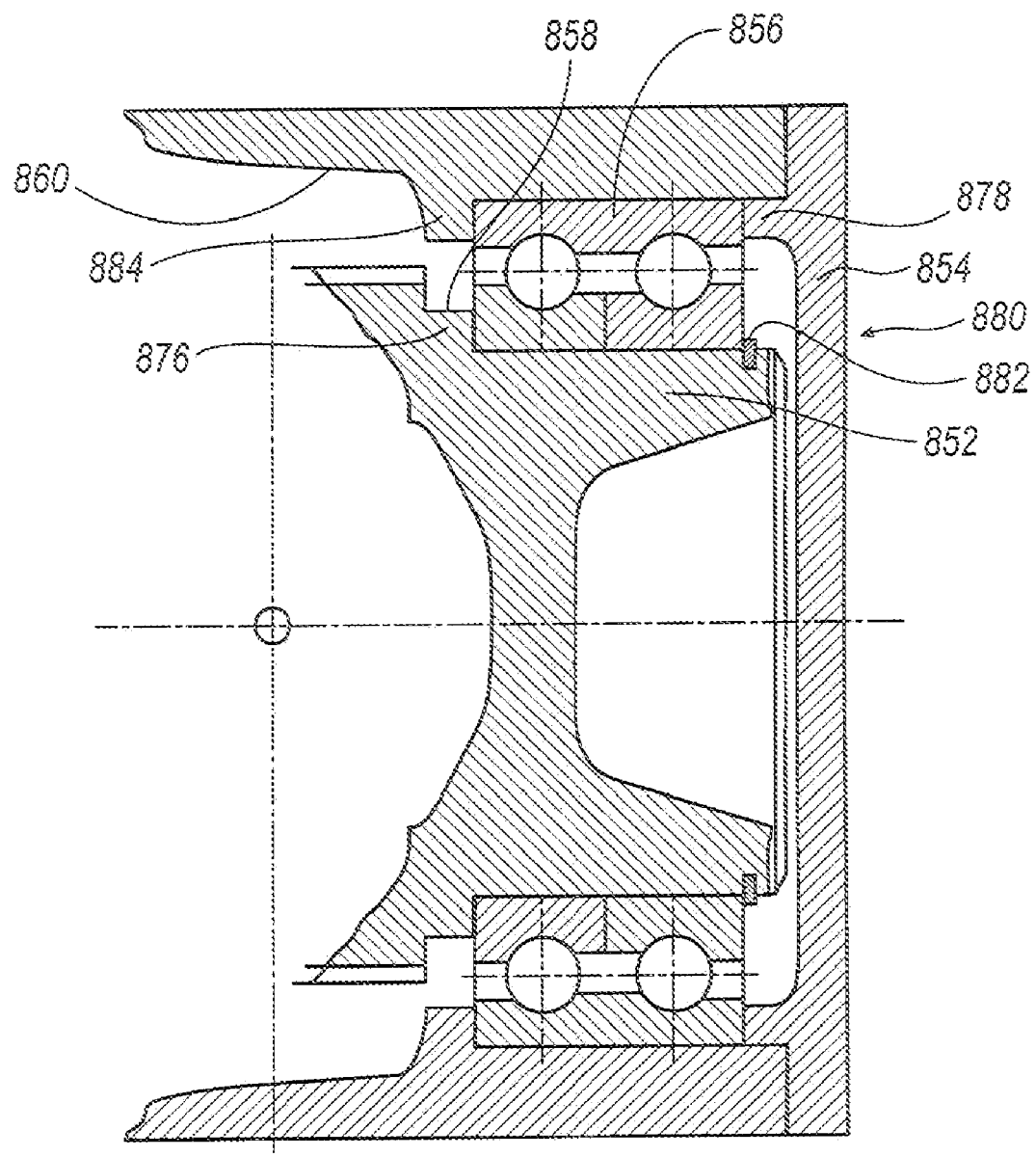

In a third embodiment, as shown FIG. 22, bearings 856 are retained between outer race 852 and transfer case 854 by a shoulder 876 formed on outside surface 858 of outer race 852 and by a positioning member 878 that extends laterally from an end portion 880 of transfer case 854. Ring fasteners 882 retain bearings 856 opposite shoulder 876 and positioning member 878. Another alternative embodiment includes interior surface 860 of transfer case 854 extending inwardly a predetermined distance to form a shoulder 884 (shown in FIG. 23) that is positioned so as to oppose shoulder 876 of outer race 852, thereby eliminating one of ring fasteners 882.

Figure 24:
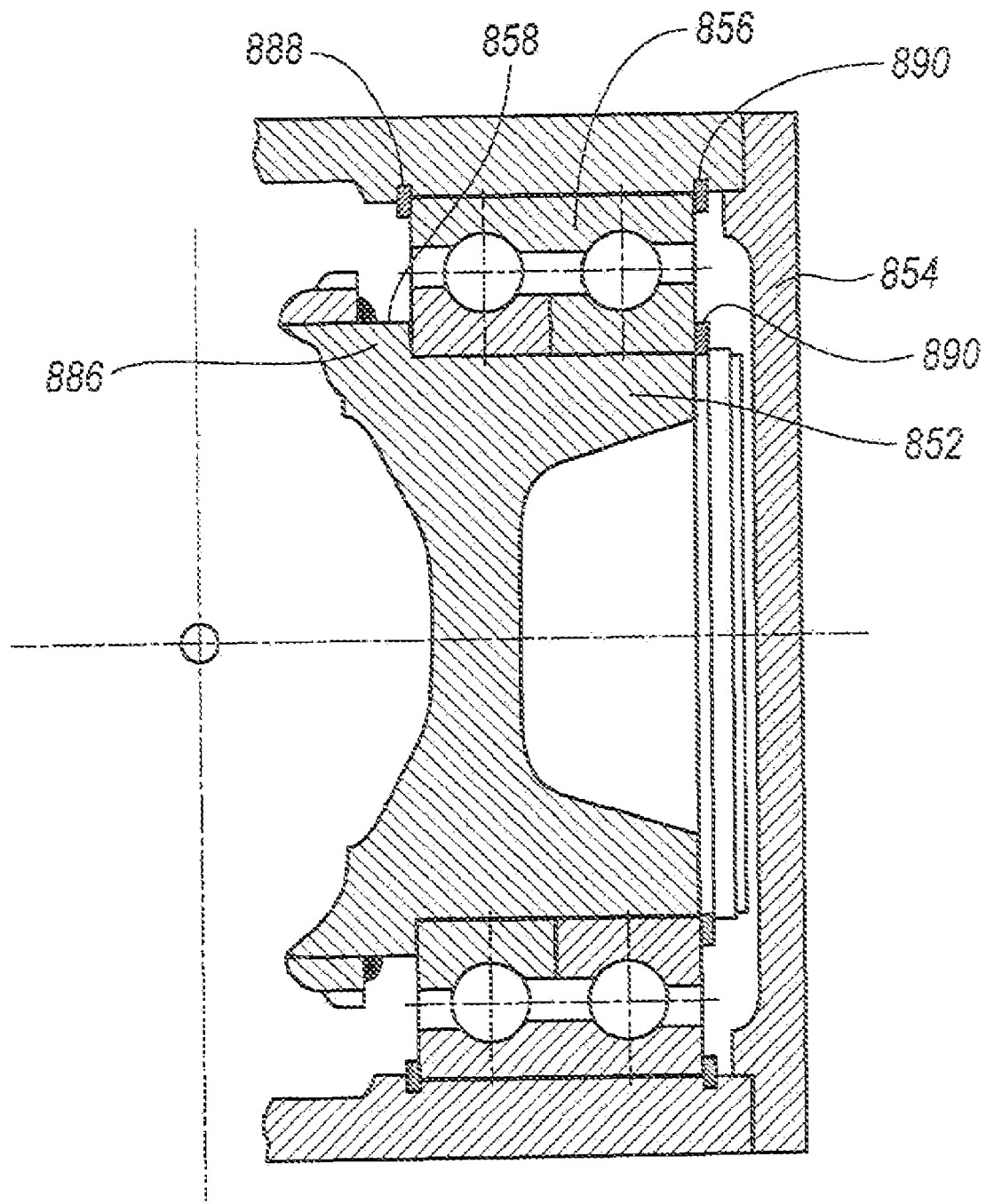

Another embodiment is shown in FIG. 24. In this embodiment, bearings 856 are positioned against a shoulder 886 that extends from an outer surface 858 of outer race 852. A ring fastener 888 is positioned directly opposite shoulder 886 to retain a second corner of bearings 856. Similarly, the remaining corners of bearings 856 are retained by ring fasteners 890, as well.

Figure 25:
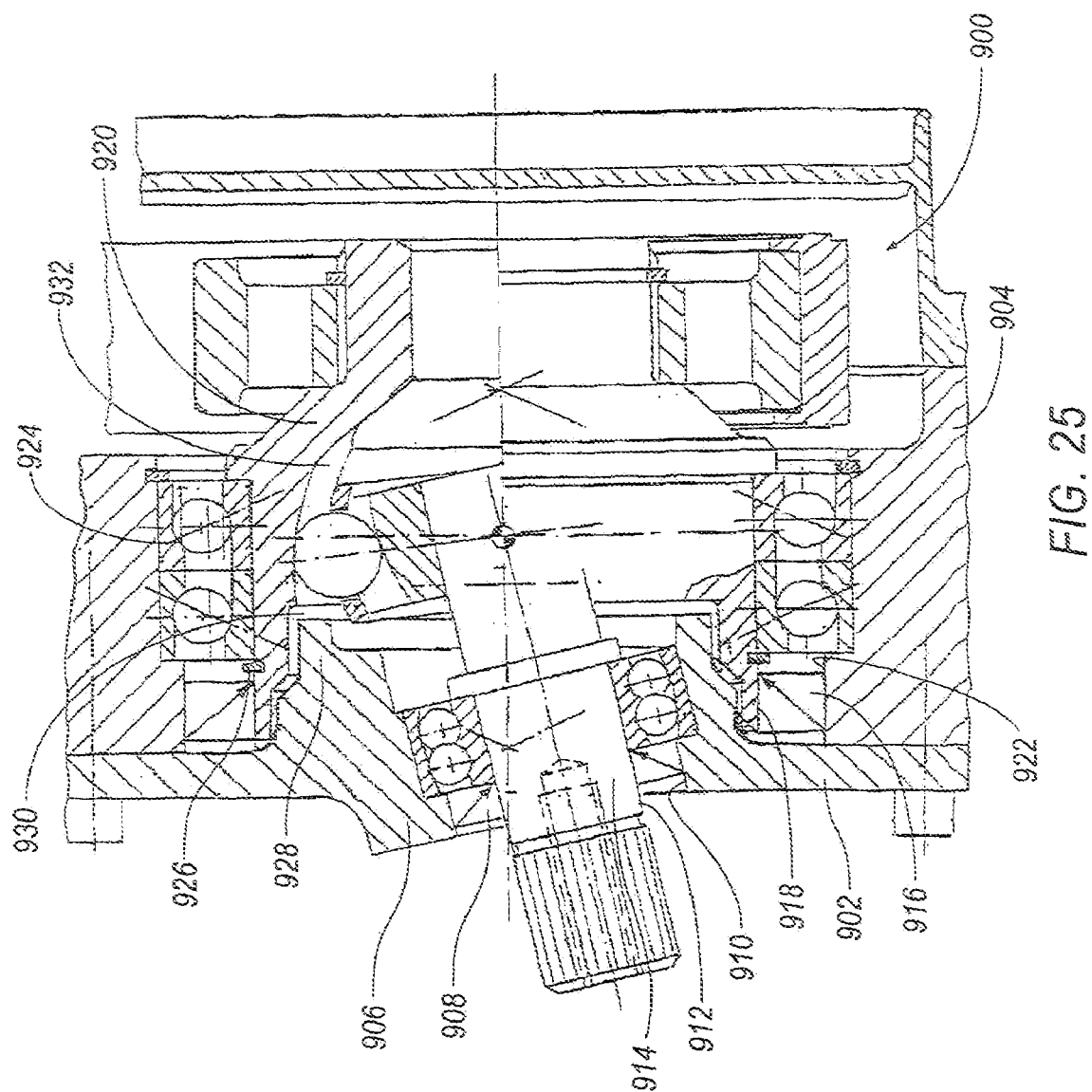
FIG. 25 illustrates an alternative embodiment of a constant velocity joint that incorporates a hub according to the present invention.

FIG. 25 illustrates another embodiment of a constant velocity joint 900 in accordance with the present invention. Constant velocity joint 900 is similar in construction as the embodiment shown in FIG. 16 above. In accordance with the present invention, constant velocity joint 900 includes a one-piece cover 902 that is fixed to a transfer case 904. Cover 902 includes a hub 906 that is formed, cast or manufactured to form a single, integral unit. In accordance with one aspect of the invention, hub 906 includes a seal 908 that is positioned between an inner surface 910 of hub 906 and the outside surface 912 of an output shaft 914. Seal 908 serves to ensure that no contaminates enter and that no lubricant leaks from constant velocity joint 900 attached to transfer case 904.

Constant velocity joint 900 also includes a seal 916 that is positioned between an outside surface 918 of an outer race 920 and an inner surface 922 of transfer case 904. Seal 916 is positioned adjacent a set of bearings 924 that are similarly positioned between inner surface 922 of transfer case 904 and outer surface 918 of outer race 920 of constant velocity joint 900. Bearings 924 are secured within transfer case 904 via any known fastening means. In one embodiment, snap rings 926 are used to secure bearings 924 in place with relation to transfer case 904 and outer race 920.

In accordance with another aspect of the invention, cover 902 also includes a circumferential shaped extension 928 that extends a predetermined distance within an inner bore 930 of outer race 920. Extension 928 of cover 902 within bore 930 of outer race 920 assists in keeping the lubricant within an inner chamber 932 of constant velocity joint 900 to provide for proper lubrication of the joint. As discussed above with respect to FIGS. 15 and 16, constant velocity joint 900 is fixed at predetermined angle which is defined between output shaft 914 and either a front differential or rear differential (not shown). Therefore, this design allows only one output angle capable of being used between transfer case 904 and the differential and therefore is used for specific type applications where only one departure angle is needed or required for the drive system. It should also be noted that the departure angle, which is chosen, can be any known departure angle used in any type of automotive vehicle drive train system.

Figure 26:
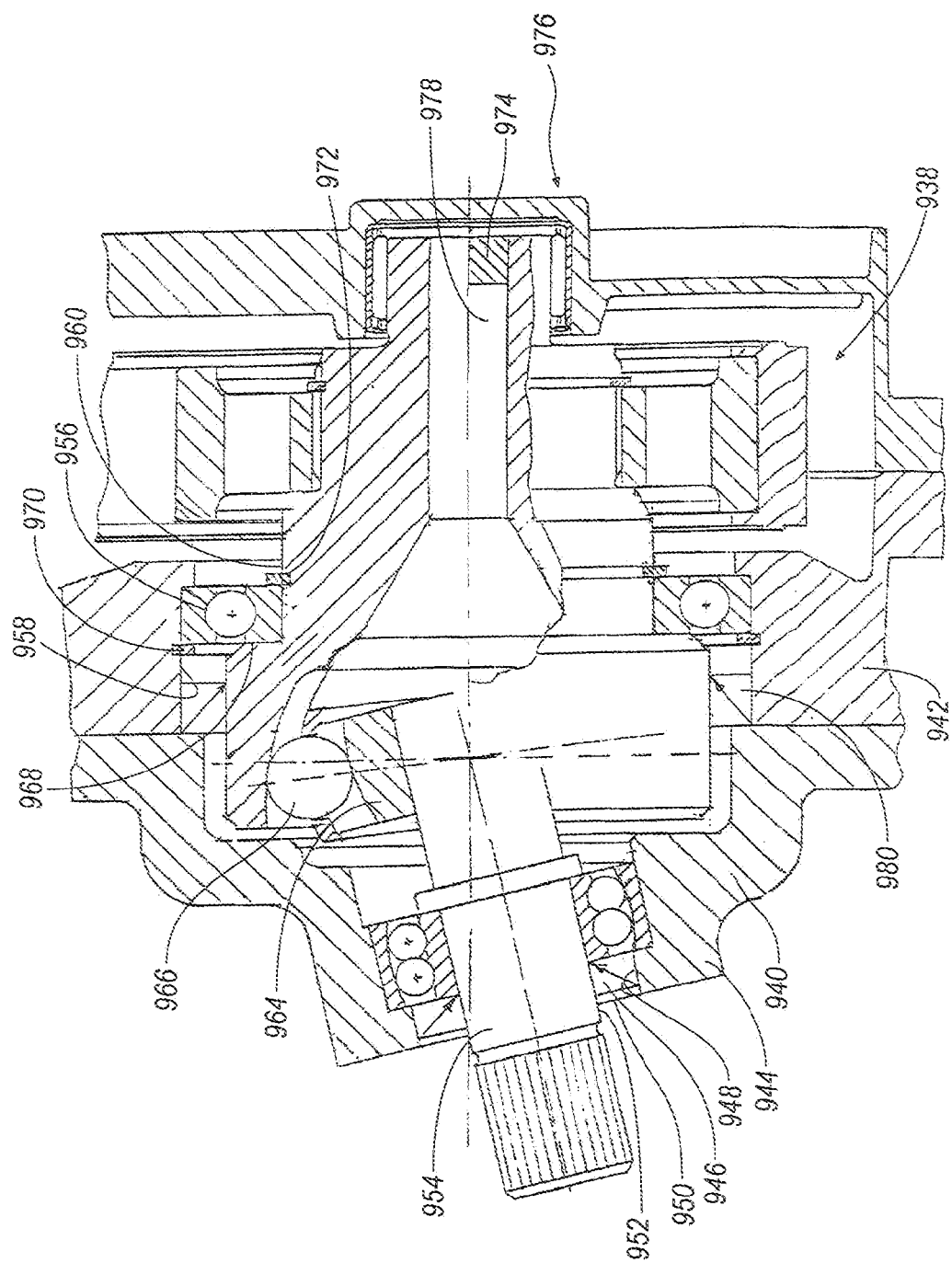
FIG. 26 illustrates an alternative embodiment of a constant velocity joint used in a transfer case according to the present invention.

FIG. 26 illustrates yet another alternative embodiment of a constant velocity joint 938 according to the present invention. Constant velocity joint 938 shown in FIG. 26 is generally similar to the embodiments that are shown in FIGS. 16 and 19, as described above. Constant velocity joint 938 also includes a one-piece cover 940 that is fixed to a transfer case 942 that houses constant velocity joint 938. Cover 940 includes a hub 944 that is formed, cast or manufactured therein to create a single, integral unit. Hub 944 includes a seal 946 that is positioned between an inner surface 948 of a bore 950 that extends through hub 944 and an outside surface 952 of an output shaft 954. Seal 946 protects against contaminates entering into constant velocity joint 938. Seal 946 also prohibits lubricant from leaking from constant velocity joint 938 that is housed within and attached to transfer case 942.

Constant velocity joint 938 further includes a bearing 956 that is positioned between an inner surface 958 of transfer case 942 and an outer surface 960 of an outer race 962 of constant velocity joint 938. Bearing 956 is positioned at a predetermined axial distance from an inner race 964 and a rolling element 966 of constant velocity joint 938. Bearing 956 is engaged with a shoulder 968 of outer race 962 and is held in place by first and second snap rings 970, 972 or other suitable fasteners. In accordance with another aspect of the invention, bearing 956 may also have a reduced width, thereby increasing compactness and alleviating packaging concerns for constant velocity joint 938.

Constant velocity joint 938 also includes a plug 974. Plug 974 is positioned at one end 976 of outer race 962. Plug 974 is positioned within a bore 978 that extends through outer race 962.

It should be noted that constant velocity joint 938 may be used with a transfer case 942 as shown in FIG. 26, in both an oil lubricated constant velocity joint environment and a grease packed constant velocity joint environment. In either environment, constant velocity joint 938 may also include a selectively removable seal 980 that is positioned between an outer surface 960 of a constant velocity joint 938 and inner surface 958 of transfer case 942 and/or cover 940.

The embodiment shown in FIG. 26 is also fixed at a predetermined angle which is defined between output shaft 954 and either a front differential or rear differential (not shown). Therefore, this design allows one output angle capable of being used between transfer case 942 and the differentials and will be used for specific type of applications where only one departure angle is needed or required for the drive system.

Figure 27:
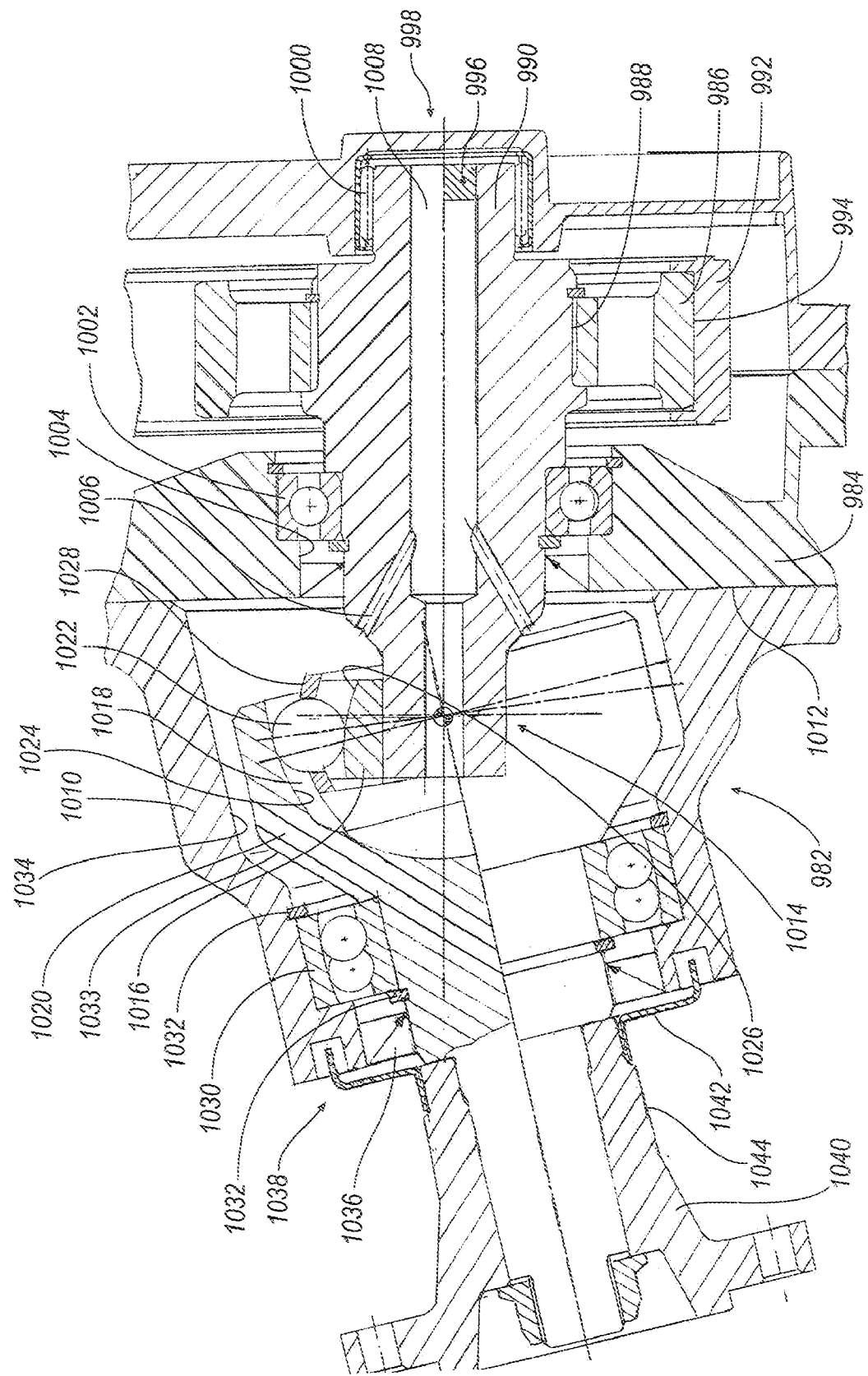
FIG. 27 illustrates an alternative embodiment of a constant velocity joint used in a transfer case according to the present invention.

FIG. 27 illustrates another alternative embodiment of a constant velocity joint 982 that is attached to a transfer case 984 in accordance to the present invention. In the embodiment shown in FIG. 27, transfer case 984 includes a sprocket 986 attached to an outer surface 988 of a stub shaft 990. Sprocket 986 is attached to stub shaft 990 via any known fastening means such as splines, etc. Sprocket 986 further includes a chain 992 that has a first end looped over teeth formed on an outer surface 994 of sprocket 986. A second end is looped over and connected to an input shaft (not shown).

Stub shaft 990 includes a plug or seal 996 at one end 998 thereof. Stub shaft 990 is rotatably supported by a pin bearing or roller 1000 on end 998 thereof and by a bearing 1002 that is spaced away from bearing 1000, and located between outside surface 988 of stub shaft 990 and an interior surface 1004 of transfer case 984. Bearings 1000 and 1002 act to support and allow stub shaft 990 to rotate with respect to transfer case 984.

In accordance with another aspect of the invention, stub shaft 990 may also include at least one channel 1006 that extends through stub shaft 990 and into an inner bore 1008 that extends through stub shaft 990. Channel 1006 allows for oil or any known lubricant to pass between transfer case 984 and a constant velocity joint housing 1010.

Constant velocity joint housing 1010 is attached to an outer surface 1012 of transfer case 984. Constant velocity joint housing 1010 is arranged at a predetermined angle corresponds to an angle of a front or rear differential of an automotive vehicle drive train system.

Stub shaft 990 includes a second end 1014 that extends into constant velocity joint housing 1010 and into an inner race 1016 of constant velocity joint 982. Inner race 1016 is arranged within a bore 1018 of an outer race 1020 of the constant velocity joint 982. A rolling element 1022, such as a torque-transmitting ball, is arranged between an inner surface 1024 of outer race 1020 and an outer surface 1026 of inner race 1016. Rolling element 1022 is held in place via a roller cage 1028. Outer race 1020 is rotatably supported within constant velocity joint housing 1010 by at least one bearing 1030. Bearing 1030 is held in place via any known fastener 1032. In one embodiment, first and second snap rings are used to secure bearing 1030 between an outer surface 1033 of outer race 1020 and an interior surface 1034 of constant velocity joint housing 1010.

A seal 1036 is arranged between an outer surface 1033 of outer race 1020 and interior surface 1034 of constant velocity joint housing 1010 at an end 1038 of constant velocity joint housing 1010.

A flange 1040 may be arranged at end 1038 of constant velocity joint housing 1010. Flange 1040 will transfer the rotational velocity from transfer case 984 to a propeller shaft connected to the front or rear differential (not shown). A secondary sealing element 1042 may be arranged between constant velocity joint housing 1010 and an outside surface 1044 of flange 1040.

It should be noted that both an oil lubricated constant velocity joint version and a greased packed version of the constant velocity joint 982 according to FIG. 27 are contemplated. In operation, stub shaft 990 of transfer case 984 transfers torque from the transmission to constant velocity joint 982 that is positioned in the constant velocity joint housing 1010. Constant velocity joint 982 then transfers torque to a front or rear differential depending on the location of transfer case 984.

As discussed above, constant velocity joint housing 1010 is fixed at a predetermined angle. However, it is understood that numerous angles may be used depending on the design environment of the automotive vehicle. These numerous angles can be manufactured via the initial casting and/or forming of constant velocity joint housing 1010. It should be noted that any known techniques may be used to connect constant velocity joint housing 1010 to transfer case 984. In the embodiment of FIG. 27, transfer case 984 is connected to constant velocity joint housing 1010 using standard components.

Figure 28:
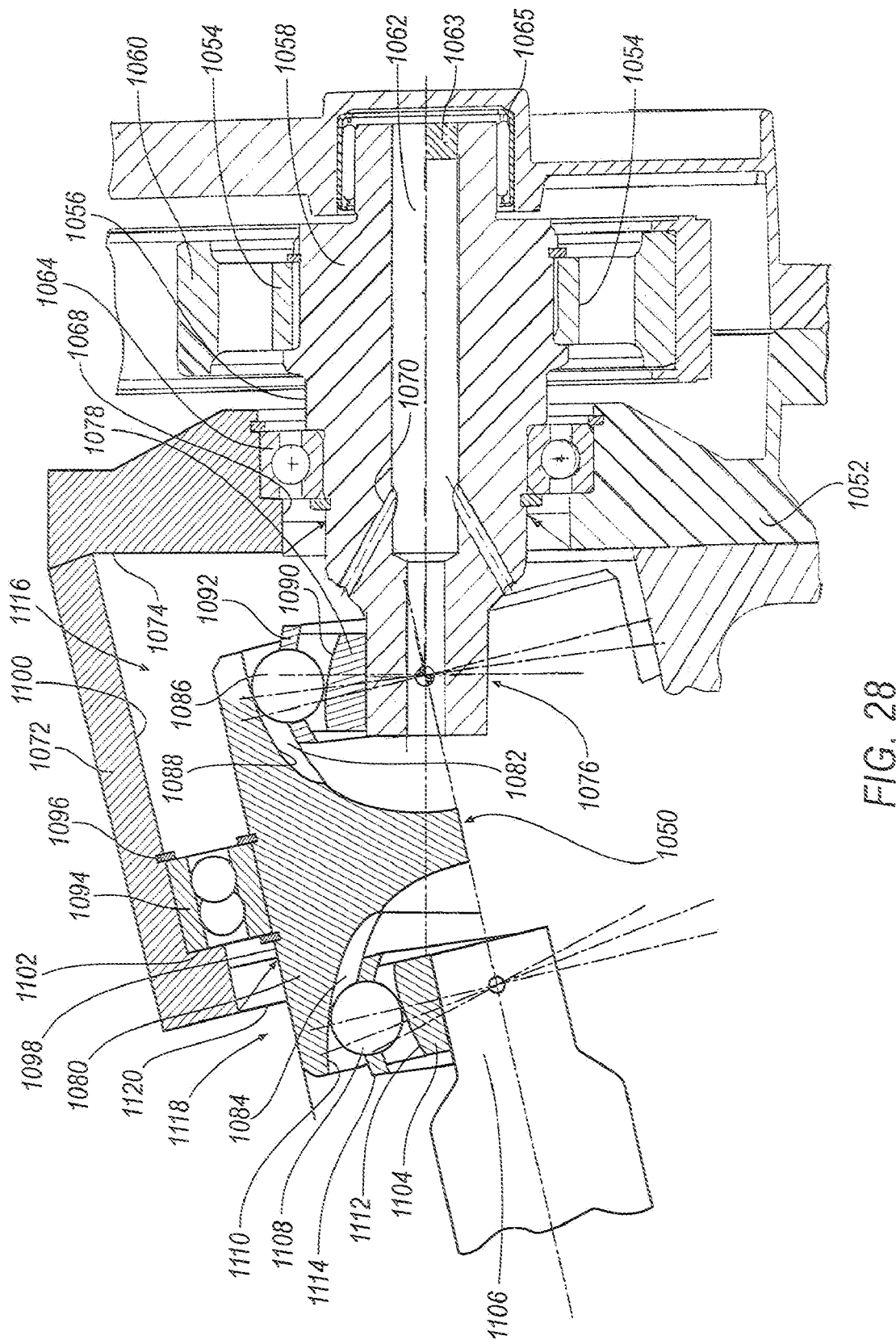
FIG. 28 illustrates another alternative embodiment of a constant velocity joint used in a transfer case according to the present invention.

FIG. 28 illustrates yet another embodiment of a constant velocity joint 1050 for use with a transfer case 1052 in accordance with the present invention. Transfer case 1052 includes a sprocket 1054 that is attached to an outer surface 1056 of a stub shaft 1058. Sprocket 1054 may be attached to stub shaft 1058 by any known fastening means, such as splines, etc. A chain 1060 has a first loop that is looped around sprocket 1054. A second loop is connected to a sprocket on an input shaft (not shown) of transfer case 1052.

Stub shaft 1058 has an inner bore 1062 extending therethrough and may include a plug or seal 1063. Stub shaft 1058 is rotatably supported by a pin bearing or roller 1065 on one end, and by a bearing 1064. Bearing 1064 is positioned between outer surface 1056 of stub shaft 1058 and an interior surface 1068 of transfer case 1052. Bearing 1064 cooperates with the pin or roller bearing 1065 to support and allow stub shaft 1058 to rotate with respect to transfer case 1052. Stub shaft 1058 may also include at least one channel 1070 extending therethrough to inner bore 1062. Channels 1070 permit oil or any other suitable lubricant to pass between transfer case 1052 and a constant velocity joint housing 1072.

Constant velocity joint housing 1072 is attached to an outer surface 1074 of transfer case 1052 by any suitable method. In accordance with one aspect of the invention, constant velocity joint housing 1072 has a predetermined angle that will mate with a front or rear differential (not shown) of an automotive vehicle drive train system.

Stub shaft 1058 has an end 1076 that extends outward from transfer case 1052 and into constant velocity joint housing 1072. Secured to end 1076 of stub shaft 1058 is a first inner race 1078. First inner race 1078 is arranged within a bore of an outer race 1080 of constant velocity joint 1050. Outer race 1080 generally has a first 1082 and a second chamber 1084 that are located on opposite ends of outer race 1080. It should be noted that chambers 1082, 1084 may have an inner connecting passage therebetween or be sized so as to merge together to form one large chamber in another contemplated embodiment.

A first roller element in the embodiment shown, a ball 1086, is arranged between an inner surface 1088 of outer race 1080 and outer surface 1090 of first inner race 1078. A roller cage 1092 maintains first roller element 1086 in contact with outer race 1080 and first inner race 1078.

Outer race 1080 is rotatably supported within constant velocity joint housing 1072 by at least one bearing 1094. Bearing 1094 is held in place by any suitable fastener 1096. For example, as shown in FIG. 28, bearing 1094 is held in place between an outside surface 1098 of outer race 1080 and an interior surface 1100 of constant velocity joint housing 1072 by a plurality of snap rings. In one embodiment, constant velocity joint housing 1072 includes at least one support shoulder 1102 for retaining and positioning bearing 1094.

Constant velocity joint 1050 includes a second inner race 1104 that is rotatably mounted within outer race 1080 of the constant velocity joint 1050. Second inner race 1104 is operatively connected to a second stub shaft or propeller shaft 1106 which is connected to a flange or directly to a front or rear differential (not shown) of the drive train system. A second roller element, at least one ball 1108, is arranged between an inner surface 1110 of outer race 1080 and an outer surface 1112 of second inner race 1104. A second roller cage 1114 is arranged between outer race 1080 and inner race 1104 and operates to position second roller element 1108 between second inner race 1104 and outer race 1080 of constant velocity joint 1050. In accordance with one aspect of the invention, second inner race 1104 will be capable of changing to any angle shaft 1106 has with respect to the front differential or rear differential of the drive train system.

While both the first and second rotational portions of constant velocity joint 1050 in the embodiment shown are fixed constant velocity joints, it should be noted that a plunge joint of any known type may be used and is contemplated to be used for either portion of constant velocity joint 1050. Accordingly, constant velocity joint 1050 is separated into a first portion 1116 on an inner side of constant velocity joint housing 1072, adjacent to transfer case 1052, and a second portion 1118 which is arranged on an outer side of constant velocity joint housing 1072.

In accordance with another aspect of the invention, constant velocity joint 1050 may also include a seal 1120 to ensure that contaminates do not enter constant velocity joint 1050. In one embodiment, seal 1120 is positioned adjacent an opening formed in constant velocity joint housing 1072 between outside surface 1098 of outer race 1080 and interior surface 1100 of constant velocity joint housing 1072. Alternatively, a boot may be arranged between outside surface 1098 of outer race 1080 or constant velocity joint housing 1072 and stub shaft or propeller shaft 1106 to ensure contaminants do not enter the constant velocity joint housing 1072 and/or constant velocity joint first and second portions 1116 and 1118.

It should be noted that while constant velocity joint 1050 is fixed at a predetermined angle; numerous angles may be used depending on the design environment of the automotive vehicle. Indeed, numerous angles may be manufactured via the initial casting and/or forming of constant velocity joint housing 1072.

In the embodiment shown in FIG. 28, constant velocity joint housing 1072 provides for using a predetermined angle from constant velocity joint 1050 to a differential to transfer rotational velocities at that predetermined angle. This action is achieved by stub shaft 1058 from transfer case 1052 transferring rotational torque to first portion 1116 of constant velocity joint 1050 at a predetermined angle. Next, constant velocity joint 1050, via outer race 1080, transfers the rotational torque via second portion 1118 of constant velocity joint 1050 to a differential or the like.

Figure 29:
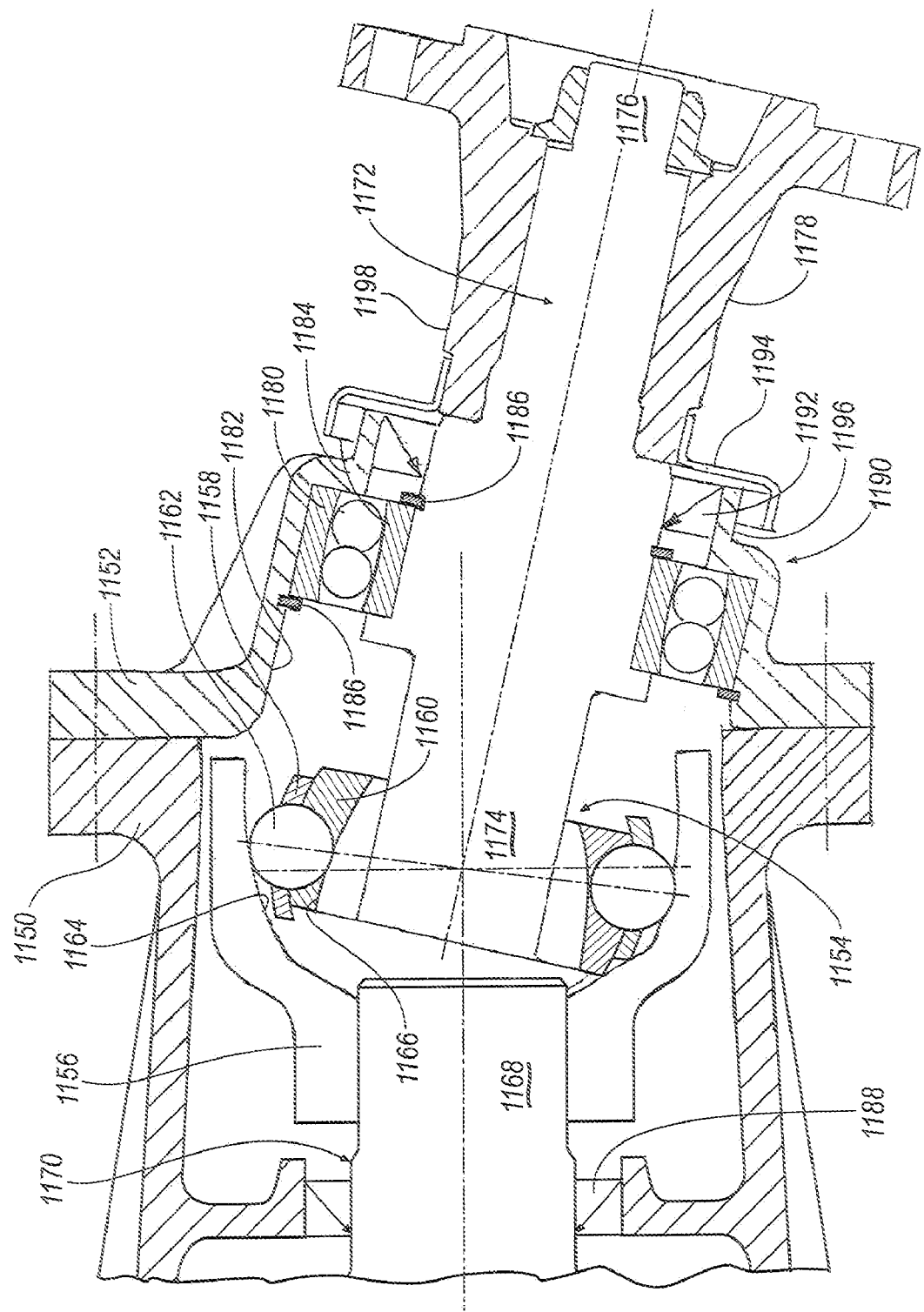
FIG. 29 illustrates yet another alternative embodiment of a constant velocity joint used in a transfer case according to the present invention.

While the present invention has been described in connection with employing a constant velocity joint within a transfer case for transferring torque to a front output shaft, the invention may also be employed for use with a rear output shaft. Referring to FIG. 29, a portion of a transfer case 1150 that is attached to a constant velocity joint housing 1152 is shown. Transfer case 1150 and constant velocity joint housing 1152 house a constant velocity joint 1154 in accordance with the present invention.

Constant velocity joint 1154 includes an outer race 1156 in which a roller cage 1158 is mounted. An inner race 1160 is mounted within roller cage 1158. A plurality of torque transmitting balls 1162 are positioned within orifices formed in a surface of roller cage 1158 such that balls 1162 contact an inner surface 1164 of outer race 1156 and an outer surface 1166 of inner race 1160.

Transfer case 1150 includes an opening formed therethrough, through which a distal end 1168 of an input shaft 1170 which is attached to a transmission extends. Input shaft 1170 extends through the opening in transfer case 1150 and distal end 1168 extends through an opening formed through outer race 1156 and is fixed thereto. Accordingly, as input shaft 1170 rotates, outer race 1156, which is fixed thereto, also rotates, thereby transferring torque to inner race 1160 via balls 1162.

A stub shaft 1172 has a distal end 1174 engaged with inner race 1160. An opposite end 1176 extends outwardly from constant velocity joint housing 1152 and may further include a flange 1178 mounted thereon. Thus, when torque is transferred to inner race 1160, stub shaft 1172 is also caused to rotate.

To support stub shaft 1172 for rotational movement within constant velocity joint housing 1152, one or more bearings 1180 may be secured to stub shaft 1172 and an interior surface 1182 of constant velocity joint housing 1152. In one embodiment, constant velocity joint housing 1152 includes a supporting shoulder 1184 that partially supports bearings 1180. Snap rings 1186 or other suitable mounting devices may also be employed.

To seal constant velocity joint 1154, the opening of transfer case 1150 may incorporate a seal 1188 that would extend around input shaft 1170. A forward end 1190 of constant velocity joint housing 1152 may also incorporate a seal 1192 between interior surface 1182 thereof and stub shaft 1172. A secondary sealing element 1194 may be arranged between an outside surface 1196 of constant velocity joint housing 1152 and an outside surface 1198 of flange 1178.

It should be noted that in all embodiments shown above all of the parts are preferably constructed of a steel material. However, it is understood that any other suitable metal, hard ceramic, hard plastic, hard composite, may also be used in the design of all components of any of the disclosed systems.

The constant velocity joints as described above including both the fixed and plunging type joints, are capable of having outer races that are hollow to allow for cooling of the inner chamber of the constant velocity joints by the transfer case oil. It is also contemplated to cool the entire transfer case with the grease that is generally used within the constant velocity joints. However, in some embodiments, the constant velocity joint inner chambers are self sealed with lubricant and are completely sealed and not capable of communication with the inner chamber of the transfer case which is bathed in transfer case oil to provide lubrication and coolant.

The disclosed embodiments are also capable of using any combination of the types of transfer cases discussed above with any of the types of constant velocity joints discussed including non-rotating boots, rotating boots, ten ball, eight ball, six ball joints or the like with any of the described combinations such that numerous combinations are available to the designers within the constant velocity joint and transfer case environment.

While the invention above discloses the constant velocity joints of the present invention being incorporated into a transfer case, it is also understood that the disclosed constant velocity joints may be incorporated into a gearbox or marine applications, without departing from the invention.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed:

1. A torque transfer device with a constant velocity joint incorporated therein, comprising:
    a constant velocity joint that includes:
    an outer race rotatably mounted within said torque transfer device; and
    an inner race positioned within said outer race and operatively connected to said outer race by one or more torque transmitting balls;
    a drive mechanism connected to said outer race of said constant velocity joint, said drive mechanism transferring torque received from an input shaft of said torque transfer device to said outer race of said constant velocity joint such that said outer race drives said inner race;
    an output shaft operably connected to said inner race of said constant velocity joint, said output shaft fixed at a predetermined angle relative to an axis of rotation of said outer race of said constant velocity joint by a hub in cooperation with a cover through which said output shaft extends;
    wherein at least one of said cover and said hub further includes a circumferential shaped extension that extends a predetermined distance within an inner bore of said outer race; and
    wherein said cover is fixedly connected to said torque transfer device.

2. The torque transfer device of claim 1, wherein said outer race is rotatably supported within the torque transfer device by first and second bearings, wherein said first bearing is connected to a distal end of said outer race and the interior surface of the torque transfer device, and wherein said second bearing is connected to an outer surface of a forward end of said outer race and said interior surface of the torque transfer device.

3. The torque transfer device of claim 1, further including an annular seal surrounding a forward portion of said outer race so as to be sandwiched between said torque transfer device and said outer race.

4. The torque transfer device of claim 3, further including a secondary annular seal positioned between said cover and said torque transfer device.

5. The torque transfer device of claim 1, wherein said hub is integrally formed with said cover.

6. The torque transfer device of claim 1, wherein said outer race is rotatable relative to said cover.

7. The torque transfer device of claim 1, wherein said output shaft is rotatable relative to said hub.

* * * * *